US007756689B1

(12) United States Patent
Lin et al.

(10) Patent No.: US 7,756,689 B1
(45) Date of Patent: *Jul. 13, 2010

(54) NUMERICAL MODELING OF SIX-DEGREE-FREEDOM SHIP MOTION

(75) Inventors: Ray-Qing Lin, Clarksville, MD (US); Weijia Kuang, Columbia, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 615 days.

This patent is subject to a terminal disclaimer.

(21) Appl. No.: 11/713,838

(22) Filed: Feb. 22, 2007

Related U.S. Application Data

(63) Continuation-in-part of application No. 11/518,740, filed on Sep. 1, 2006.

(60) Provisional application No. 60/778,166, filed on Feb. 28, 2006, provisional application No. 60/847,396, filed on Sep. 15, 2006.

(51) Int. Cl.
*G06F 17/10* (2006.01)
(52) U.S. Cl. ............................................... 703/2; 703/8
(58) Field of Classification Search .................... 703/2, 703/8
See application file for complete search history.

(56) References Cited

U.S. PATENT DOCUMENTS 5,089,972 A * 2/1992 Nachman et al. ............ 700/218

OTHER PUBLICATIONS

Kreuzer et al., Dynamics of Ship-Motion, Nov. 2003, Wiley-VCH Verlag GmbH & Co. KGaA, Weinheim, PAMM, vol. 3 Issue 1, pp. 84-87.*

Tupper, Introduction to Naval Architecture, 2004, Elsevier Butterworth-Heinemann, Chapters 11-15, pp. 218-327.*
Zhang et al., On nonlinear ship waves and wave resistance calculations, 1999, Journal of Marine Science and Technolog, pp. 7-15.*
Goss, Motion Simulation—A Real Time Particle System for Display of Ship Wakes, May 1990, IEEE, pp. 30-36.*
Martinelli et al., A fast multigrid method for solving the nonlinear ship wave problem with free surface, Aug. 1993, Proceedings of the 6th International Conference of Numerical Ship Hydrodynamics.*
Jones et al., Polyharmonic Balance Analysis of Nonlinear Ship Roll Response, 2004 Kluwer Academic Publishers, pp. 123-146.*

(Continued)

*Primary Examiner*—Paul L Rodriguez
*Assistant Examiner*—Aniss Chad
(74) *Attorney, Agent, or Firm*—Howard Kaiser

(57) ABSTRACT

The present invention's new calculative methodology models the motion of a seagoing vessel in six dimensions, uniquely employing a total velocity potential as the sole parameterization for taking into consideration all linear and nonlinear dynamical effects involved in interaction between the vessel and environmental water. The solid-body rotational motion of the vessel about the vessel's center of mass is determined in three dimensions (roll, pitch, yaw) by calculating the pressure torque and the buoyancy torque. The solid-body translational motion of the vessel's center of mass is determined in three dimensions (heave, surge, sway) by calculating the pressure force and the buoyancy force. The pressure torque and the pressure force are each associated with pressure (e.g., non-hydrostatic pressure) of water on the vessel's surface. The buoyancy torque and the buoyancy force are each associated with the displacement of the vessel with respect to the vessel's equilibrium position in the water.

18 Claims, 24 Drawing Sheets

OTHER PUBLICATIONS

Bulgarelli et al., Numerical modelling of free-surface flows in ship hydrodynamics, 2003 John Wiley & Sons, Ltd, pp. 465-481.*

Oliver, A Time Domain Simulation Method for Ship Motion and Load Prediction 1985 Ship Structure Committee.*

U.S. Appl. No. 11/518,740, filed Sep. 1, 2006, entitled "Numerical Modeling of Nonlinear Ship-Wave Interactions," joint inventors Ray-Qing Lin and Weijia Kuang.

U.S. Appl. No. 60/847,396, filed Sep. 15, 2006, entitled "On the Impact of Above Waterline Ship Geometry on Roll Motion," joint inventors Ray-Qing Lin and Weijia Kuang.

U.S. Appl. No. 60/778,166, filed Feb. 28, 2006, entitled "Numerical Modeling of Nonlinear Interactions between Ships and Surface Gravity Waves," joint inventors Ray-Qing Lin and Weijia Kuang.

Ray-Qing Lin and Weijia Kuang, "Nonlinear Ship-Wave Interaction Model, Part 2: Ship Boundary Condition," *Journal of Ship Research*, vol. 50, No. 2, Jun. 2006, pp. 181-186.

Ray-Qing Lin, Weijia Kuang, and Arthur M. Reed, "Numerical Modeling of Nonlinear Interactions between Ships and Surface Gravity Waves, Part 1: Ship Waves in Calm Water," *Journal of Ship Research*, vol. 49, No. 1, Mar. 2005, pp. 1-11.

Ray-Qing Lin and Weijia Kuang, "Nonlinear Waves of a Steadily Moving Ship in Environmental Waves," *Journal of Marine Science and Technology*, vol. 8, Jan. 2004, pp. 109-116.

Ray-Qing Lin and Weijai Kuang, "A Finite Amplitude Steady Ship Motion Model," *Proceedings of the 24th Symposium on Naval Hydrodynamics*, Fukuoka, Japan, Jul. 8-13, 2002, The National Academies Press, Washington, D.C., 2003, pp. 322-332.

Ray-Qing Lin and Will Perrie, "A New Coastal Wave Model, Part III: Nonlinear Wave-Wave Interaction," *Journal of Physical Oceanography*, American Meteorological Society, vol. 27, Sep. 1997, pp. 1813-1826.

Ray-Qing Lin and Weijia Kuang, "On the Impact of Above Waterline Ship Geometry on Roll Motion," International Conference on Marine Research and Transportation (ICMRT) 2005, the Island of Ischia (Gulf of Naples, Italy), Sep. 19-21, 2005 (6 pages).

USPTO communication, U.S. Appl. No. 11/518,740, mail date Jun. 24, 2009, 14 pages total, including: cover sheet, Office action (8 pages); Office-acknowledged Information Disclosure Statement by Applicant (1 page); Office Notice of References Cited (1 page).

Ray-Qing Lin and W. Thomas, "Ship Stability Study in the Coastal Region: New Coastal Wave Model Coupled with a Dynamic Stability Model," Twenty-Third Symposium on Naval Hydrodynamics, Val de Reuil, France, Sep. 17-22, 2000, National Academy of Sciences (2001) (10 pages).

* cited by examiner

NUMERICAL MODELING OF SIX-DEGREE-FREEDOM SHIP MOTION

CROSS-REFERENCE TO RELATED APPLICATIONS

This application is a continuation-in-part of U.S. nonprovisional patent application Ser. No. 11/518,740, filing date 1 Sep. 2006, hereby incorporated herein by reference, entitled "Numerical Modeling of Nonlinear Ship-Wave Interactions," joint inventors Ray-Qing Lin and Weijia Kuang, which claims the benefit of U.S. provisional patent application No. 60/778, 166, filing date 28 Feb. 2006, hereby incorporated herein by reference, entitled "Numerical Modeling of Nonlinear Interactions between Ships and Surface Gravity Waves," joint inventors Ray-Qing Lin and Weijia Kuang.

This application claims the benefit of aforesaid U.S. provisional patent application No. 60/778,166, filing date 28 Feb. 2006, hereby incorporated herein by reference, entitled "Numerical Modeling of Nonlinear Interactions between Ships and Surface Gravity Waves," joint inventors Ray-Qing Lin and Weijia Kuang.

This application claims the benefit of U.S. provisional patent application no. 60/847,396, filing date 15 Sep. 2006, hereby incorporated herein by reference, entitled "On the Impact of Above Waterline Ship Geometry on Roll Motion," joint inventors Ray-Qing Lin and Weijia Kuang.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to motions of marine vessels while interacting with environmental waves, more particularly to methodologies for modeling such motions.

A seagoing ship is characterized by motion describable in terms of six degrees of freedom, viz., heave, surge, sway, roll, pitch, and yaw. More generally, the term "six degrees of freedom" is conventionally used to describe both translational motion and rotational motion of a body with respect to three perpendicular axes in three-dimensional space. Regarding motion of ships, the three kinds of translational ship motion are commonly referred to as heave (linear movement along a vertical axis), surge (linear movement along a horizontal fore-and-aft axis), and sway (linear movement along a horizontal port-and-starboard axis); the three kinds of rotational ship motion are commonly referred to as roll (rotational movement about a horizontal fore-and-aft axis), pitch (rotational movement about a horizontal port-and-starboard axis), and yaw (rotational movement about a vertical axis).

Ship motion at sea has always been among the most important problems for naval architects and engineers. Accurate prediction of the ship motions in real time can be critical for preventing large amplitude ship motions or the capsizing of vessels. This is particularly so for some modern day marine vessels such as fast passenger ferries, high-powered naval vessels, and high-powered cargo ships.

The history of ship motion research can be traced back more than a half century. In 1953, St. Denis and Pierson first proposed a statistical ship response in a realistic seaway by approximating ship motion in a linear system. Their work provided a respected tool to naval architects for estimating ship motions. Peters and Stoker (1957) then developed the first analytical prediction theory; see A. S. Peters and J. J. Stoker, "The Motion of a Ship, As a Floating Rigid Body, in a Seaway," *Commun. Pure Appl. Math.*, 10: 399-490, 1957. Because in their theory the ship's beam and unsteady motions are assumed comparable and small, Peters and Stokers' theory is called a first-order theory. Later Newman (1961) improved the first-order theory by introducing a set of small parameters and better body boundary conditions; see J. N. Newman, "A Linearized Theory for the Motion of a Thin Ship in Regular Waves," *J. Ship Res.* 3(1): 1-9, 1961.

Ogilvie and Tuck (1969) developed a "strip theory" in which the linear ship motion coefficients are introduced based on the slender-body assumption, such as added masses and damping coefficients for heave and pitch motions; see T. F. Ogilvie and O. Tuck, "A Rational Strip Theory of Ship Motions: Part I," Report-13, Dept. of the Navy, *Arch. Mar. Eng.*, University of Michigan, Ann Arbor, pages 92+, 1969. Since Ogilvie and Tuck's strip theory includes terms containing some surface integration over the free surface, it is very difficult to implement computationally. There is an inconsistency in the strip theory: the formulation is applicable in the short wavelength domains, while the slender-body approximation works in long wavelength domains. Improvements in strip theory were developed to reconcile the difference existing within Tuck's strip theory. Notably, Maruo (1970) developed an interpolation theory, and later Newman (1978) developed a unified theory, so that the first-order theory approach can be applied over wider frequency domains; see H. Maruo, "An Improvement of the Slender Body Theory for Oscillating Ships with Zero Forward Speed," *Bull. Fac. Eng. Yokohama Nat'l Univer.* 19: 45-56, 1970; J. N. Newman, "The Theory of Ship Motions," *Advances in Applied Mechanics* 18: 221-83, 1978.

As faster and more powerful computers have become available, the Neumann-Kelvin approach (which basically involves strip theory) has been adopted in numerical modeling, such as disclosed by Beck and Magee (1990), Magee (1994), and Shin et al. (1997); see R. F. Beck, R. F. and A. R. Magee, "Time-Domain Analysis for Predicting Ship Motions," *Dynamics of Marine Vehicles and Structure in Waves*, W. G. Price, P. Temarel & A. J. Keane, Eds., Elvesier Sciences Publishers B. V., pages 49-64, 1990; A. Magee, "Seakeeping Applications using a Time-Domain Method," *Proc. 20$^{th}$ Symp. Naval Hydro.*, Santa Barbara, Calif., 19 pages, 1994; Y.-S. Shin, J. S. Chung, W. M. Lin, S. Zhang and A. Engle, "Dynamic Loadings for Structural Analysis of Fine Form Container Ship Based on a Non-Linear Large Amplitude Motions and Loads Method," *Trans. SNAME* 105: 127-54, 1997. Although Neumann-Kelvin is a linear theory, it has been a great success in ship motion research because it can be applied to arbitrary exact ship surfaces, and because the hull boundary conditions can be satisfied on the exact wetted surface of the ship body with the linearized free-surface boundary conditions.

Nevertheless, the Neumann-Kelvin theory has its own problems, such as in solving a forward-speed Green function in finite water depth; see R. F. Beck and A. M. Reed, "Modern Seakeeping Computations for Ships," *Proceedings for 23$^{rd}$ Naval Hydrodynamics Conference*, Val-de-Reuil, France, National Academy of Sciences, pages 1-43, 2000. Still, as pointed out by Beck and Reed, probably about eighty percent of design related to ship motion calculation is based on the strip theory because, compared to other theories, it is fast, reliable, and able to accommodate various hull forms. In fact, all linear theories are ultimately beset with limitations; in particular, they cannot model any nonlinear processes. In many cases, the nonlinear processes dominate the linear effects in determining ship motions. To address this limitation, several "blending methods" were developed. For a detailed discussion, the reader is referred to the ISSC report on "Extreme Hull Girder Loading," *Committee VI.1 Report, 14th International Ship and Offshore Structures Congress* 2000, Nagasaki, Japan, 59 pages, 2000.

More recently, Wilson et al. (1998) and Gentaz et al. (1999) attempted to solve the Reynolds Averaged Navier-Stokes equations in time domain (RANS); see R. Wilson, E. Paterson and F. Stern, "Unsteady RANS CFD Method for Naval Combatants in Waves," *Proc. Symp. Naval Hydro.*, 22nd, Washington, D.C., Washington, D.C.: Natl. Acad. Press, pages 532-49, 1998; L. Gentaz, P. E. Guillermo, B. Alessandrini and G. Delhommeau, "Three-dimensional Free-Surface Viscous Flow around a Ship in Forced Motion," *Proc. 7th International Conf. Num. Ship Hydro.*, Paris, France, 12 pages. Wilson et al. and Gentaz et al. applied iterative methods for steady solutions, and time-stepping methods for unsteady solutions. Their approaches are by far inconclusive, partly due to insufficient numerical results. In general, Wilson et al. and Gentaz et al. have convergence problems when the sea environment is rough and the ship forward speed is high.

According to traditional ship motion analysis, the translational and rotational solid-body motions (six degrees of freedom) of ships are approximated with parameterized forces. The traditional formulation is straightforward but is dynamically inconsistent because the forces involved are very complicated and correspond to each other in accordance with the dynamics of the ship motion. These complex forces are associated with interactions between the ship and surface waves and with departures of the ship from its equilibrium position. In principle, appropriate parameterization of such complicated dynamical forces is impossible. Consequently, it is common in conventional practice to introduce additional parameters lacking solid physics foundations in order to emulate real ship solid-body motions. An unwanted side effect of this approach is that the introductions of additional but unnecessary variables hamper computational efficiencies.

Many studies have been made on the nonlinearity of ship motion. For example, Y. Liu et al., "A High-Order Spectral Method for Nonlinear Wave-Body Interactions," *J. Fluid Mech.* 245:115-136 (1992), uses a high-order spectral method to study nonlinear interactions between the ship and the water surface. See also, W. M. Lin et al., "Numerical Solution for Large-Amplitude Ship Motions in the Time-Domain," *Proc. 18th Symp. Naval Hydrod.*, U. Michigan, Ann Arbor, Mich. (1990); W. M. Lin et al., "Large-Amplitude Motions and Wave Loads for Ship Design," *Proc. 20th Symposium on Naval Hydrodynamics*, Santa Barbara, Calif. (1994); Y. Liu et al., "Computations of Fully Nonlinear Three-Dimensional Wave-Wave Wave-Body Interactions, Part 2. Nonlinear Waves And Forces," *J Fluid Mech,* 438:41-66 (2000); M. H. Xue et al., "Computations of Full Nonlinear Three-Dimensional Wave-Wave and Wave-Body Interactions, Part I. Dynamics of Steep Three-Dimensional Waves," *J. Fluid Mech,* 438:11-39 (2001).

Unfortunately, there are still empirical or linear parameters used in modeling six-degree-freedom ship motions, e.g., added mass and damping mass for each degree of motion. The intrinsic limitations of these parameters can potentially affect the accuracy of the nonlinear ship motion models. For example, the added mass and the damping mass are often determined from the ship's geometry below the waterline in calm water; see A. R. Magee and R. F. Beck, *Compendium of Ship Motion Calculations Using Linear Time-Domain Analysis*, Department of Naval Architecture and Marine Engineering, College of Engineering University of Michigan (1988), e.g., page 192. However, the ship's geometry below the waterline when the ship is underway in waves is very different from that in calm water, and is continually changing due to speed and wave action.

It is therefore desirable to develop a new ship motion model: that maintains similar advantages of the strip theory but also efficiently models all nonlinear processes in ship motions; that is based on the fundamental laws of physics and precise mathematical formulations; that is consistent with variations of water environments and ship properties; and, that is capable of simulating ship position variations due to ship-wave interactions.

SUMMARY OF THE INVENTION

In view of the foregoing, it is an object of the present invention to provide a robust numerical model that can be used to study the motions of ships traveling through environmental waves.

Another object of the present invention is to provide such a model that is sufficiently flexible for arbitrary single-hull and multi-hull ships.

A further object of the present invention is to provide such a model that is sufficiently flexible for extreme environmental conditions.

It is a another object of the present invention to provide such a model that is computationally efficient.

It is a further object of the present invention to provide such a model that is capable of real-time or near-real-time applications.

The present inventors' afore-noted nonprovisional patent application Ser. No. 11/518,740 filed 1 Sep. 2006 discloses, inter alia, their inventive numerical model of nonlinear ship-wave interactions. Application Ser. No. 11/518,740 is largely concerned with the hydrodynamics of interactions between ships and surface waves—e.g., surface wave modifications due to ship motions. In contrast, the instant application is largely concerned with the motions of ships in the context of interactions between ships and surface waves—e.g., ship position variations due to ship-wave interactions. The present invention's numerical model evaluates time variation of ship solid body motion (translational and rotational motion) under the forces arising from arbitrary ship-surface wave interactions and ship underwater positions.

According to the inventive hydrodynamics model of U.S. nonprovisional patent application Ser. No. 11/518,740, filed on 1 Sep. 2006, the spectral method is used to solve surface waves in the numerical domain, taking mathematical advantage of similarities between surface wave solutions and the basic functions of the spectral expansion. The spectral method is found by the present inventors to be inappropriate for the ship body, however. Ship dimensions are, in general, much smaller than those of the numerical domain, and the ship body geometries can be very complicated, often with corners and sharp edges. If spectral method were used to solve for the ship body, then the truncation order would be extremely high and special effort would be required to avoid "Gibbs effects" caused by sharp edges. Instead, the inventive hydrodynamics model uses finite element method in ship boundary and pseudo-spectral method in global domain. A quasi-linear method is used in each time step to transform the information between the ship boundary and global domain. The inventive hydrodynamics model thus enables efficient study of complicated ship geometry in steep incident waves. It succeeds in evaluating physical quantities in different numerical meshes. Also disclosed in U.S. nonprovisional patent application Ser. No. 11/518,740 is a ship surface pressure correction method to calculate pressure. According to the inventive pressure determination method, any singularity characterizing pressure distribution is eliminated, and a smooth function permits efficient and accurate calculation of pressure.

The present inventors' U.S. application Ser. No. 11/518,740 discloses a fully nonlinear, computationally efficient, hydrodynamics model characterized by steady ship motion. The term "steady ship motion" as used by the present inventors implies that the response of the ship to all exerting forces (arising from ship-wave, wave-wave interactions) is not included. In effect, the instant application adds the ship response (in the form of six-degree solid-body motion) to the corresponding effect on surface waves (with which U.S. application Ser. No. 11/518,740 is concerned). By the instant disclosure the present inventors incorporate ship solid-body motion dynamics into their hybrid model. The present invention involves "solid body motion" instead of "rigid body motion" because the bending effects on the ship are not taken into consideration.

Speaking generally in the fields of fluid dynamics and fluid mechanics, a "velocity potential" is a scalar function for the flow of a fluid (e.g., an irrotational fluid), wherein the gradient of the scalar function is equal to the velocity of the fluid. According to typical practice of the present invention's solid-body ship motion model, disclosed herein, the three-dimensional ship rotation is governed by the Louisville (solid-body rotation) equation, whereby: (i) the dynamic torque from the pressure acts on the ship body surface; and, (ii) the buoyancy torque arises from the displacement of the ship from the equilibrium position in water. Similarly, the three-dimensional ship translation motion is governed by the solid-body translation equation, whereby: (i) the dynamic force from the pressure acts on the ship body surface; and, (ii) the buoyancy force arises from the displacement of the ship from the equilibrium position in water. In the inventive ship motion model, a total velocity potential is used to include all linear and nonlinear effects in the dynamical process. No other parameterization, such as the added mass and the damping coefficient, is employed in the inventive ship motion model. All interactions, and thus all forces and torques on the ship body, are continuously updated and are used to determine six-degree ship motions. With all interactions included, the inventive ship motion model can be used for accurately and efficiently evaluating solid-body ship motion for very high Froude numbers and very steep incident waves.

The present invention's ship motion model is a fully nonlinear, dynamically consistent, time-varying numerical model that determines six-degrees-of-freedom ship motion (fully three-dimensional translational and rotational motions) under arbitrary ship-surface wave interactions. The inventive ship motion model: is computationally efficient; can be applied to ship design, ship construction and ship operation (e.g., real-time operation); can be applied to single-hull and multi-hull marine vessels in arbitrary water environment; calculates forces on ship bodies from the first principles; determines ship positions consistently with respect to the environmental surface waves; involves mathematical and numerical procedures to accurately and efficiently evaluate the forces and ship positions; does not require parameterization on the forces to ship bodies; is easily coupled to the present inventors' nonlinear steady ship motion model to establish a new framework for ship design engineering and ship operations.

In order to correctly model the ship solid body motion, the present invention correctly evaluates various forces on the ship body. Two major forces are determined accurately in accordance with the present invention, viz: (1) the surface force arising from the non-hydrostatic water pressure on ship surface; and, (2) the buoyancy force arising from ship position departure from the equilibrium state. The translational motion of the ship center of mass and the solid-body rotation of the ship about the center of mass are then determined by the net force and the net torque relative to the center of mass. In the present invention's ship motion model, all forces and ship positions are evaluated from the first principles; no approximation is made in any aspect of modeling except for approximations due to numerical discretization.

U.S. application Ser. No. 11/518,740 focuses upon nonlinear interactions between incident waves and ship bodies. The instant application focuses upon motions of ship bodies considered as solid ship bodies. Unlike other ship motion models, the present invention's ship motion model as typically practiced uses one total velocity potential instead of eight velocity potentials. In accordance with typical embodiments of the present invention, ship motion under various nonlinear forces is calculated exactly (e.g., without any "blending") from first principles. The inventive ship motion model can determine, with consistency, the transformations between the ship reference frame (centered at the ship mass center and attached to the ship) and the surface wave reference frame (moving horizontally with the ship translation velocity and centered on the mean surface of the water); hence, the inventive ship motion model can determine, with consistency, the ship solid body motion. Provided by the inventive ship motion model is a systematic, generic formulation of ship positions (including equilibrium state, underwater ship surface and volume), founded in part on its recognition that accurate force evaluation can best be achieved in the ship reference frame. The inventive ship motion model is capable of correctly modeling ship solid body six-degree-freedom motions with respect to specified incoming surface waves.

The present inventors' two unique models—viz., (i) their ship motion model (presently disclosed) and (ii) their ship hydrodynamics model (disclosed in their application Ser. No. 11/518,740)—can be coupled so as to together constitute a comprehensive framework that is capable of simulating, in arbitrary water environment, both (i) ship motion and (ii) ship-wave interaction. The present inventors' combination of their presently disclosed ship motion model (which simulates ship motions) and their previously disclosed ship-wave hydrodynamics model (which simulates the effects of ship motions, e.g., specified steady ship motions, on surface waves) thus represents a complete framework—an inventive "hybrid" model—for simulating all dynamical processes of ships in arbitrary water environment. This inventive framework can be a very useful tool for assisting ship design engineering and real time ship operation. The present invention's fully nonlinear "four-dimensional" (three spatial dimensions plus the temporal dimension) hybrid ship model includes all nonlinear interactions between the ship and surface waves (incident waves and ship generated waves) and between the waves themselves.

Typical practice of either or both of the present inventors' numerical modeling methodologies implements a computer processing unit and succeeds in finding superior solutions in shorter CPU durations. The present inventors have developed a prototypical computer program product that they have named "Digital, Self-consistent, Ship Experimental Laboratory," abbreviated "DiSSEL." DiSSEL is a prototypical embodiment of the present inventors' hybrid model, which addresses both ship-wave interaction and ship motion. The inventive hybrid model represents a hybridization of their presently disclosed ship motion model (which simulates ship motions) and their previously disclosed ship-wave interaction hydrodynamics model (which simulates the effects of ship motions, e.g., specified steady ship motions, on surface waves). Essentially, according to the present inventors' DiSSEL model, a hybrid algorithm based on spectral, finite difference and finite element methods is used to solve the fundamental nonlinear equations that govern the dynamics of surface waves and ship motions. Parameterization that had been assumed in the previous studies on ship motion modeling has been minimized in this inventive model. The DiSSEL model combines two main components, viz., (ii) a fully nonlinear ship-wave interaction model ("DiSSEL_SW") and, coupled therewith, (ii) a six-degree, ship solid body motion model ("DiSSEL_SB").

According to the DiSSEL_SW component of the DiSSEL model, the physical processes are described in the reference frame moving horizontally with the mass center of the ship. The corresponding equations in this reference frame are the incompressibility condition, $$\nabla^2 \varphi = \nabla_h^2 \varphi + \frac{\partial^2 \varphi}{\partial z^2} = 0 \quad \text{for} \quad -H \leq z \leq \eta$$

where $\nabla_h$ is the horizontal gradient, $\varphi$ is the total velocity potential; the dynamic and kinematic boundary conditions at the free surface $z=\eta$ $$\frac{\partial \varphi}{\partial t} + \left(\frac{1}{2}\nabla \varphi + u_s\right) \cdot \nabla \varphi + g\eta + \frac{p}{\rho} + \frac{\partial u_s}{\partial t} \cdot x - \nu \nabla_h^2 \varphi = 0,$$

$$\frac{\partial \eta}{\partial t} + (\nabla_h \eta) \cdot (\nabla_h \varphi + u_s) = \frac{\partial \varphi}{\partial z},$$

where p is the pressure, $\rho$ is the fluid density, v is the kinematic viscosity, and x is the position vector; the impenetrable conditions at the bottom of the ocean and at the ship boundary $\Gamma$ $$\frac{\partial \varphi}{\partial z} + (\nabla_h H) \cdot (\nabla_h \varphi + u_s) = 0. \text{ at } z = -H$$

$$\hat{n} \cdot (\nabla \phi + u_t) = 0, \text{ on } \Gamma$$

where $\hat{n}$ is the unit vector of $\Gamma$, and $u_t$ is the total ship speed (translational and rotational motion speed). It should be pointed out here that we introduce some dissipation in (2) to model wave-breaking mechanisms.

The equations are also solved with the radiation boundary conditions to ensure that the ship-generated waves are left behind the ship. They are implemented as open boundary conditions away from the ship (the far field). In computational applications, the far-field boundary conditions are defined at a finite distance from the ship (instead of the asymptotic limit $x \to \infty$):

$$\frac{\partial \varphi}{\partial x} = \frac{\partial \varphi_e}{\partial x} - u_{sx}, \quad \eta = \eta_e; \text{ at } x = b$$

$$\nabla \phi = \nabla \phi_e + (\nabla \phi_s - \overline{\nabla \phi_s}) - u_s; \quad \eta = \eta_e + (\eta_s - \overline{\eta_s}); \text{ at } x = c$$

where b is the forward boundary, c are the side and aft boundaries, $\phi_e$ and $\eta_e$ are the velocity potential and the surface elevation of the environmental waves, $\phi_s$ and $\eta_s$ are those associated with the ship (e.g. ship-generated waves and the waves arising from ship-environmental wave interactions). The horizontal over-bar signifies the spatial average of the quantities. It is pointed out that the boundary conditions are consistent with the mass conservation; in calm water, $\phi_e$ and $\eta_e$, vanish.

The fully nonlinear equations are solved in the computational domain with a pseudo-spectral method; however, on the ship boundary, a finite element or a finite difference method is applied. At every time step, physical quantities are transferred, via a quasi-linear method, between the ship boundary grids and the spectral collocation points. This inventive approach can achieve computational efficiencies for arbitrary ship hulls.

According to the DiSSEL_SB component of the DiSSEL model, the six-degree-of-freedom ship solid body motion is divided into (i) a three-degree translational motion of the mass center of the ship and (ii) a three-degree rotation about the mass center of the ship.

The present invention's translational motion equation is:

$$m_{ship}\frac{dv}{dt} + D_{trans}v = F_{trans} + F_{trans}^{restore},$$

where $F_{trans}$ and $F_{trans}^{restore}$ are the net force on the ship surface and the net body restoring force, respectively. That is:

$$F_{trans} = -\int_\Gamma n \cdot P ds,$$

$$F_{trans}^{restore} = m_{ship}g + g\rho_{water}V_{wet},$$

where $\rho_{water}$ is the water density, and $V_{wet}$ is the underwater ship volume, $D_{trans}$ is damping coefficient originated from the viscous dissipation in an equation above, and g is the gravitational acceleration at the surface. Gravitational acceleration g is constant in the reference frame that moves horizontally with the ship mass center (the reference frame for surface wave calculations); however, $V_{wet}$ is time-varying, and depends on the nonlinear process described in part by above equations.

The present invention's rotational motion equation, also referred to herein as the "Louisville" equation, is:

$$I \cdot \frac{d\Omega}{dt} + \Omega \times (I \cdot \Omega) + D_{rotat}\Omega = \Gamma_{rotat}^{I+D+R} + \Gamma_{rotat}^{restore},$$

where I is the ship's moment of inertia relative to the ship mass center $x_c$. That is, $$I_{ij} = \int\int\int_{V_{ship}} dV [(x-x_c)_i^2 \delta_{ij} - (x-x_c)_i(x-x_c)_j].$$

$\Gamma_{rotat}^{I+D+R}$ is the pressure torque on the ship body, and $\Gamma_{rotat}^{restore}$ is the restoring torque arising rat from the buoyancy force. The translational motion equation and the Louisville equation are nonlinear in nature, because the torques and the forces depend on the ship motion. Linearization or parameterization of these quantities leads to wrong answers when nonlinearity becomes important.

According to the present inventors' DiSSEL, the wet surface torque and the body restoring torque are evaluated at each time step via $$\Gamma_{rotat}^{I+D+R} = -\int\int_{\Sigma_s} d\Sigma(x_s - x_c) \times nP,$$

$$\Gamma_{rotat}^{restore} = (x_{wet} - x_c) \times \rho_{water} V_{wet} g,$$

where $x_{wet}$ is the geometric center of the underwater ship volume $V_{wet}$, and $\Sigma_i$ are the wetted surfaces with i=4, 5, 6 for roll, pitch and yaw motions, respectively. It is pointed out that the fluid viscosity is not included in the present inventors' DiSSEL system.

Incorporated herein by reference are the following five papers, each of which is co-authored by the present inventors: Ray-Qing Lin, Weijia Kuang, and Arthur M. Reed, "Numerical Modeling of Nonlinear Interactions between Ships and Surface Gravity Waves, Part 1: Ship Waves in Calm Water," *Journal of Ship Research*, Vol. 49, No. 1, March 2005, pages 1-11; Ray-Qing Lin and Weijia Kuang, "Nonlinear Ship-Wave Interaction Model, Part 2: Ship Boundary Condition," *Journal of Ship Research*, Vol. 50, No. 2, June 2006, pages 181-186; Ray-Qing Lin and Weijia Kuang, "Nonlinear Waves of a Steadily Moving Ship in Environmental Waves," *Journal of Marine Science and Technology*, Vol. 8, January 2004, pages 109-116; Ray-Qing Lin and Weijia Kuang, "On the Impact of Above Waterline Ship Geometry on Roll Motion," International Conference on Marine Research and Transportation (ICMRT) 2005, the Island of Ischia (Gulf of Naples, Italy), 19-21 Sep. 2005.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein.

DETAILED DESCRIPTION OF THE PRESENT INVENTION

Figure 1:
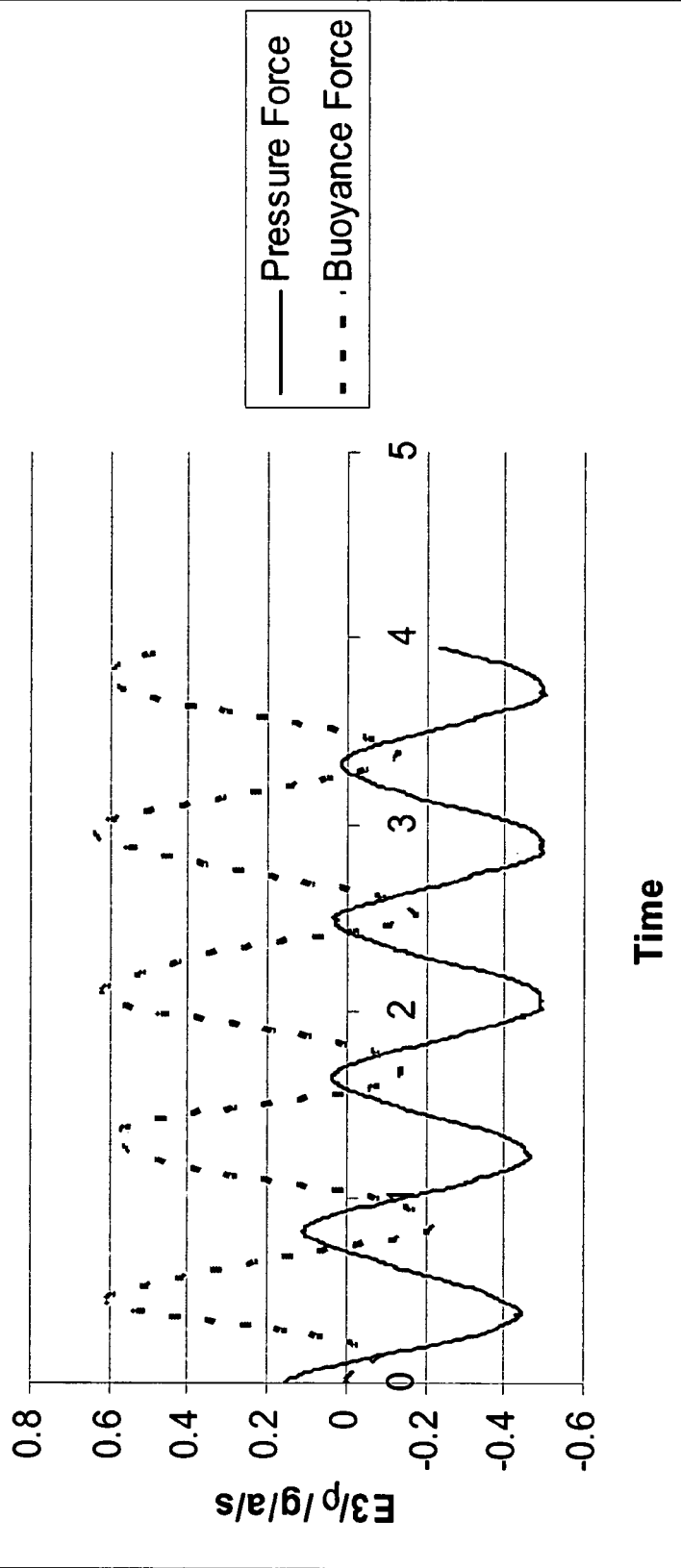
FIG. 1 is a graphical representation of time variation of the non-dimensional pressure force (the solid line) and the buoyancy force (the dotted line) for Delft Catamaran No. 372 with $F_r$=0.6.

Mathematics and discussion of the inventive ship motion model are presented hereinbelow. The present invention's mathematical formulation is set forth in the section entitled "Mathematical Model," which contains four subsections respectively entitled "Model Reference Frame," "Fluid Hydrodynamic Equations," "Solid Body Motion Equations," and "Coordinate Transformation." The present invention's numerical results, particularly as compared with those of experiments for selected cases, are treated in the section entitled "Benchmark Results." A specific technical example of the present invention is described in the section entitled "Roll Damping (Example)," which contains three subsections respectively entitled "Relationship between Ship Geometry and Ship Motion," "Roll Damping Function," and "Roll Damping Results." Concluding discussion of the present invention is contained in the section entitled "Concluding Remarks."

Mathematical Model (i) Model Reference Frame

From general solid body motion theory, a ship's movement can be decoupled into: a three-dimensional translational motion $(u_s+v_s)$ of the mass center $x_c$ of the ship; and, a three-dimensional rotation $\Omega$ about $x_c$. In this description, $u_s$ is the ship velocity moving in the calm water, and $v_s$ is the wave induced translational ship motion, $$v_s = v_x \hat{x} + v_y \hat{y} + c_z \hat{z},$$

where $v_x$, $v_y$, and $v_z$ are surge, sway, and heave motions, respectively.

Generally speaking, there are different choices of reference frames. In the inventive ship motion model, the reference frame is determined as follows: The origin of the reference frame is on the mean water surface, shifted vertically from the ship's center of mass. Therefore, the mass center is located at $(0, 0, z_c)$ in this reference frame. The x-axis passes from the stern to the bow. In addition, the reference frame moves horizontally with the ship, i.e., with the speed $$u_s + v_h \equiv (u_s + v_x)\hat{x} + v_y \hat{y}.$$

The y-coordinate points to the port, and the z-coordinate is upward.

(ii) Fluid Hydrodynamic Equations

The fluid flows at the surface and inside the water, $-H \leq z \leq \eta$, are governed by the following equations:

$$\nabla^2 \varphi \equiv \nabla_h^2 \varphi + \frac{\partial^2 \varphi}{\partial z^2} = 0, \quad (1)$$

$$(\nabla_h \equiv \hat{x}\partial/\partial x + \hat{y}\partial/\partial y),$$

where $\phi$ is the velocity potential for all waves outside the ship body (defined in the Earth-fixed coordinate system), $$\frac{\partial \varphi}{\partial t} + \left(\frac{1}{2}\nabla\varphi - (u_s + v_h)\right) \cdot \nabla\varphi + gz + \frac{p}{\rho} - \frac{\partial(u_s + v_h)}{\partial t} \cdot x - \nu\nabla_h^2\varphi = 0, \quad (2)$$

in $-H \leq z \leq \eta$, and $$\frac{\partial \eta}{\partial t} + (\nabla_h \eta) \cdot [\nabla_h \varphi - (u_s + v_h)] = \frac{\partial \varphi}{\partial t}, \quad (3)$$

on z=η. In Equation (2), g is the gravitational acceleration, p is the total pressure. The subscript h denotes the horizontal components of the vectors. Inviscid flow approximation works well for large-scale motions. However, due to nonlinear interactions, small-scale flow can be generated from interactions among large-scale waves. Thus fluid viscosity becomes important in the dynamics of these small-scale waves. To accommodate such small-scale physical processes in the inventive model, a modified dissipative coefficient v is introduced in Equation (2). The corresponding viscous term serves two purposes: (i) to model very small fluid viscosity and wave-breaking mechanisms; and, (ii) to ensure numerical convergence with moderate resolutions while retaining correct large-scale flow structures of interest. This kind of approach has been regularly used in computational fluid dynamics for many decades; see, e.g., Spiegel and Veronis, (1960), Yanai (1983). The present inventors also use this kind of approach in U.S. patent application Ser. No. 11/518,740.

Because the reference frame moves horizontally with the ship, and because ship horizontal motion is not assumed steady in our model, the acceleration effect is then given by $$\frac{\partial(u_s + v_h)}{\partial t} \cdot x$$

in Equation (2).

The boundary conditions are:

$$\frac{\partial \varphi}{\partial z} = 0. \quad (4)$$

at the flat bottom z=−H, and $$\hat{n} \cdot \nabla\varphi = \hat{n} \cdot [u_s + v_s + \Omega \times (x^\Sigma - x_c)], \quad (5)$$

on the ship surface Σ. In Equation (5), $x^\Sigma$ are the ship surface vectors, $\hat{n}$ is the normal vector of Σ (pointing outward), Ω is the three-dimensional angular velocity about the center of mass $x_c$. As further discussed hereinbelow, the angular velocity $\Omega$ and the translational velocity $v_s$ are determined by the net torques and the net forces on the ship body.

In the inventive ship motion model, the far-field radiation conditions (as $x \to \infty$) are approximated on the borders of the computational domain, bounded by the forward boundary $\Sigma_f$, the side and the aft boundaries $\Sigma_a$. Thus, $$\frac{\partial \varphi}{\partial x} = \frac{\partial \varphi_e}{\partial x} + (u_s + v_h), \quad \zeta = \zeta_e \quad (6)$$

on $\Sigma_f$. The subscript "e" denotes the quantities of the environmental waves (which vanish in calm water). On $\Sigma_a$ is the open boundary condition $$\overline{\nabla \phi} = \overline{\phi_e} + (u_s + v_h), \overline{\zeta} = \overline{\zeta_e} \quad (7)$$

where $\overline{(*)}$ denotes the average along the boundaries. Condition (7) ensures conservation of mass for incompressible flow.

As disclosed by their U.S. application Ser. No. 11/518,740, in order to study arbitrary ships in steep incident waves, the present inventors use a finite element method on the ship surface boundary, and a pseudo-spectral method in the global domain. A bi-linear interpolation is applied to transfer the information between the finite-element meshes and the collocation points. It is emphasized that evaluation of the boundary condition (See Equation (5)) is a most challenging problem for the present inventors' numerical modeling. The ship boundary $\Sigma$ itself is specified in a different mesh description, thus requiring appropriate interpolation for numerical modeling. Further, much higher resolution is required to resolve complicated boundary geometries and small-scale flow near the boundary $\Sigma$. The latter is particular important for accurately modeling interactions between the ship and the surrounding waves. As disclosed in U.S. application Ser. No. 11/518,740, a pressure correction is introduced on the ship boundary $\Sigma$ so that the flow satisfies the boundary condition Equation (5) and does so without any of the mathematical drawbacks confronting other methodologies.

(iii) Solid Body Motion Equations

In any given reference frame, the mass center of an object is given by $$r_c = \frac{1}{m_{ship}} \int \int \int_{V_{ship}} \rho_{ship} r \, dV, \quad (8)$$

where $m_{ship}$ is the total mass of the ship, $V_{ship}$ is the total ship volume; see, e.g., H. Goldstein, C. Poole, and J. Safko, *Classical Mechanics*, 3$^{rd}$ Edition, Addison-Wesley, New York, 2002. In Equation (8), r is the position vector defined in that given reference frame. In the inventive ship model reference frame, the mass center $x_c$ $$x_c = (0, 0, d_c),$$

where $d_c$ is the distance of the mass center to the mean water surface. In particular, $$\frac{dx_c}{dt} = \hat{z}(\hat{z} \cdot v_s) \quad (9)$$

In the inventive ship motion model's reference frame, the three-dimensional rotation about $x_c$ is denoted by the angular velocity $\Omega$, $$\Omega \equiv (\Omega_x, \Omega_y, \Omega_z).$$

Its (x, y, z) components are also called roll, pitch and yaw, respectively. Temporal variation of any point $x^\Sigma$ on the ship boundary is governed by $$\frac{d}{dt}(x^\Sigma - x_c) = \Omega \times (x^\Sigma - x_c) \quad (10)$$

The translational motion of the ship is determined by $$m_{ship} \frac{dv_s}{dt} + D_{trans} v_s = F^p + F^g, \quad (11)$$

where $D_{trans}$ is the damping coefficient for the translational motions, $F^p$ and $F^g$ are the net pressure force on the ship surface and the net buoyancy force, respectively:

$$F^p \equiv -\int\int_{\Sigma_{wet}} \hat{n} p \, d\Sigma,$$

$$F^g = (\rho_{water} V_{wet} - m_{ship}) g,$$

where $\rho_{water}$ is the water density, g is the gravity acceleration vector, $\Sigma_{wet}$ and $V_{wet}$ are the wetted surface and underwater volume of the ship, respectively.

The solid body rotation is governed by the Louisville equation (defined in the reference frame attached to the solid body, also referred to herein as the "ship reference frame"):

$$I \cdot \frac{d\Omega}{dt} + \Omega \times (I \cdot \Omega) + D_{rotat} \Omega = \Gamma^p + \Gamma^g, \quad (12)$$

where $D_{rotat}$ is the dissipation coefficient for the rotation, I is the moment of inertia tensor relative to the mass center, $$I_{ij} = \int\int\int_{V_{ship}} dV [(x - x_c)_l^2 \delta_{ij} - (x - x_c)_i (x - x_c)_j],$$

$\delta$ is the Kronecker delta function, $\Gamma^p$ and $\Gamma^g$ are the pressure torque and the buoyancy torque on the ship, respectively:

$$\Gamma^p = -\int\int_{\Sigma_{wet}} d\Sigma (x^\Sigma - x_c) \times \hat{n} p,$$

$$\Gamma^g = (x_{wet} - x_c) \times \rho_{water} V_{wet} g,$$

where $x_{wet}$ is the geometric center of the underwater ship volume $V_{wet}$. The dissipative coefficients $D_{trans}$ and $D_{rotat}$ are dependent upon ship geometry, mass characteristics, Froude number, incident wavelength, etc.

In the inventive ship motion model, the forces $F^p$ and $F^g$, and the torques $\Gamma^p$ and $\Gamma^g$ on the ship are from the interactions between the ship and the waves. They are calculated from the total pressure p on the ship surface and the variation of the ship underwater position. The pressure p is given by Equation (2). In other words, it is determined by the total velocity potential $\phi$. No parameterization (such as added mass or damping coefficients) is employed for the inventive calculation. The effect of the ship solid body motion on waves is described by the ship translational velocities $u_s + v_s$ in Equation (2), Equation (5), Equation (6), and Equation (7); the ship angular velocity $\Omega$ is described in Equation (5). Therefore, interactions between the ship and the waves affect not only ship motion, but also the surface waves in the domain(s) of interest.

(iv) Coordinate Transformation

In order to retain computational efficiency and local resolution near the ship boundary, it is often convenient inventive practice to solve the equations of the system in the ship reference frame (centered at $x_c$). In this reference frame, the position vectors are described by $$x_s = (x_s, y_s, z_s)^T,$$

where the superscript T means the transpose of the vector. Therefore, the relationship between the position vector x in the model reference frame and $x_s$ is given by $$x = A \cdot x_s + x_c,$$

$$x_s = A^{-1} \cdot (x - x_c). \quad (13)$$

where A is the transformation matrix, which can be represented by three Euler angles ($\theta_x, \theta_y, \theta_z$) about the (x, y, z) axes, respectively:

$$A = \begin{bmatrix} \cos\theta_z & -\sin\theta_z & 0 \\ \sin\theta_z & \cos\theta_z & 0 \\ 0 & 0 & 1 \end{bmatrix} \quad (14)$$

$$\begin{bmatrix} \cos\theta_y & 0 & \sin\theta_y \\ 0 & 1 & 0 \\ -\sin\theta_y & 0 & \cos\theta_y \end{bmatrix} \begin{bmatrix} 1 & 0 & 0 \\ 0 & \cos\theta_x & -\sin\theta_x \\ 0 & \sin\theta_x & \cos\theta_x \end{bmatrix}$$

In general, other sets of Euler angles can be used for A, as long as no two consecutive angles are defined relative to the same axis; see Goldstein et al., supra. Since A is the rotational transformation matrix, $A^{-1} = A^T$. In the ship reference frame, the ship boundary does not vary with time. Therefore, time variation of the ship position in the model reference frame is governed by that of the transformation matrix A, which, by Equation (10) and Equation (13), is of the form $$\frac{d}{dt} A_{ij} = \varepsilon_{ikl} \Omega_k A_{lj}, \quad (15)$$

where $\varepsilon_{ijk}$ is the Kronecker kernel. This equation then determines the time variation of the Euler angle vector $\theta \equiv (\theta_x, \theta_y, \theta_z)$.

In the inventive ship motion model, the time integration of the ship position is carried out as follows: Given the Euler angle vector $\theta(t_n)$ and the angular velocity $\Omega(t_n)$ at time $t_n$, the new transformation matrix $A(t_n + \Delta t)$ is obtained via Equation (15). The new ship boundary in the model reference frame is then determined by Equation (13), $$(x^\Sigma - x_c)(t_n + \Delta t) = A(t_n + \Delta t) \cdot x_s^\Sigma,$$

$$\hat{n}(t_n + \Delta t) = A(t_n + \Delta t) \cdot \hat{n}_s \quad (16)$$

All forces and torques are then evaluated with the updated ship boundary in the inventive model reference frame.

Benchmark Results

For benchmarking of their inventive ship motion model, the present inventors selected a ship/boat test model, viz., Delft Catamaran No. 372. It was designed at Delft University for Army Theater Support Vessel. The specific parameters can be found in Vessel Response (VERES) Program Users Manual; see R. V. Veer, Jr., "Experimental Results of Motions and Structural Loads on the 372 Catamaran Model in Head and Oblique Waves," Report 1130, *TUDELFT*, U.S. Department of Commerce, National Technical Information Service, Springfield, Va. 22161, 1998, page 117. Some of the dimensions of the Delft Catamaran model are as follows: the overall length is 3.11 m; the length between perpendiculars is 3 m; the overall beam is 0.94 m; the beam of a demi-hull is 0.24 m; the draught, Ap and Fp are each equal to 0.15 m; the displacement is 87.07 kg.

Figure 2:
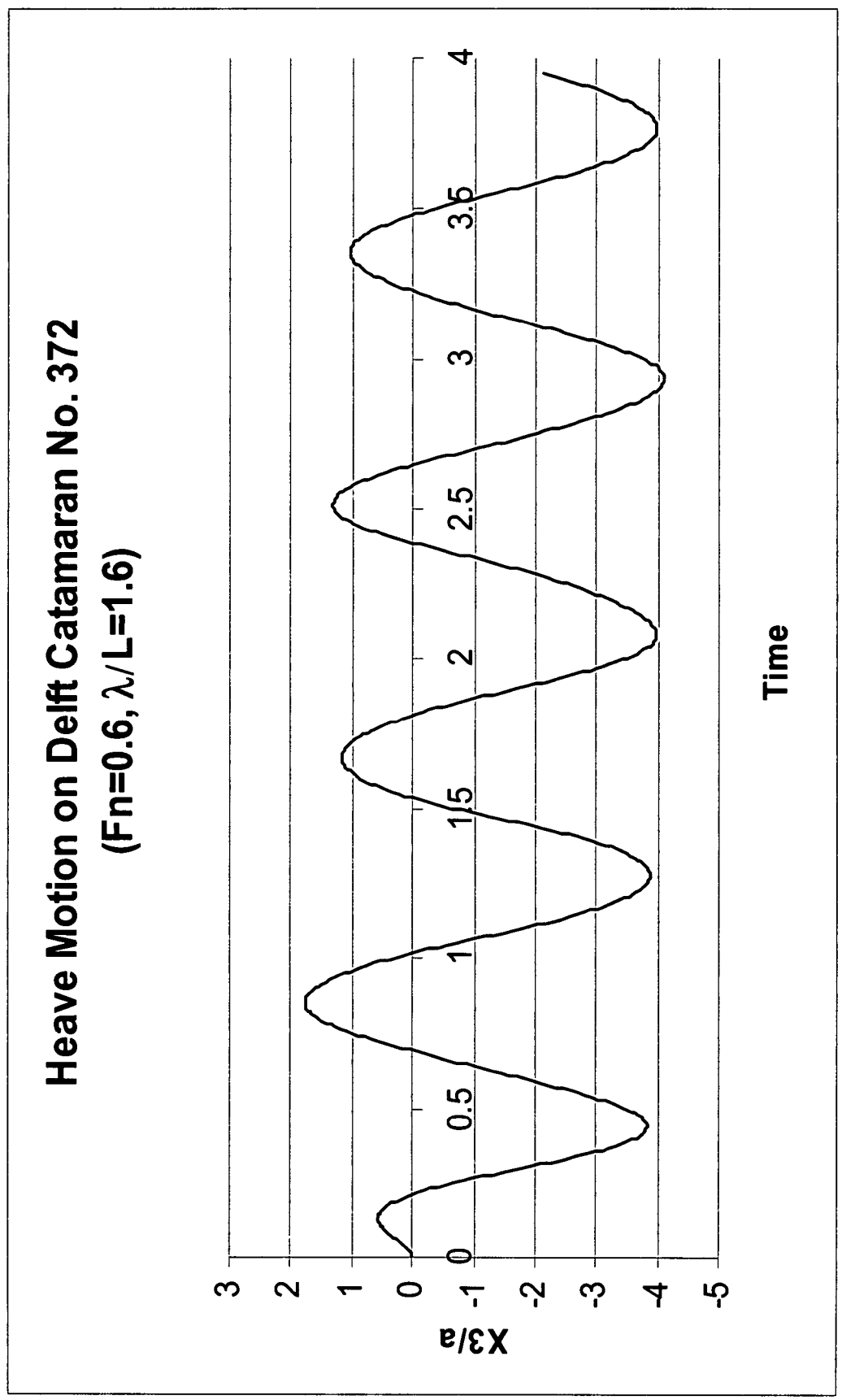
FIG. 2 is a graphical representation of the heave motion corresponding to FIG. 1 for Delft Catamaran No. 372 with $F_r$=0.6.
Figure 3:
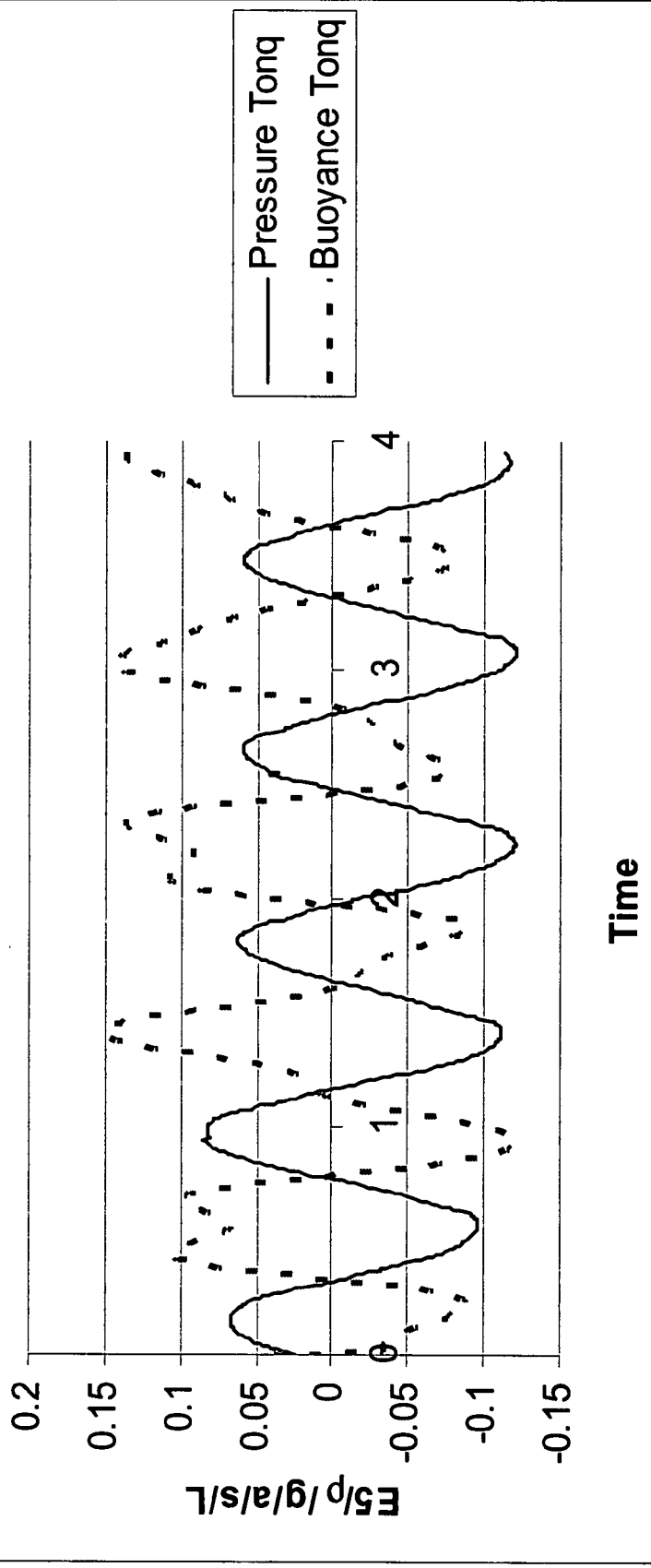
FIG. 3 is a graphical representation, similar to FIG. 1, of time variation of the non-dimensional pressure torque (the solid line) and the buoyancy torque (the dotted line) for Delft Catamaran No. 372 with $F_r$=0.6.
Figure 4:
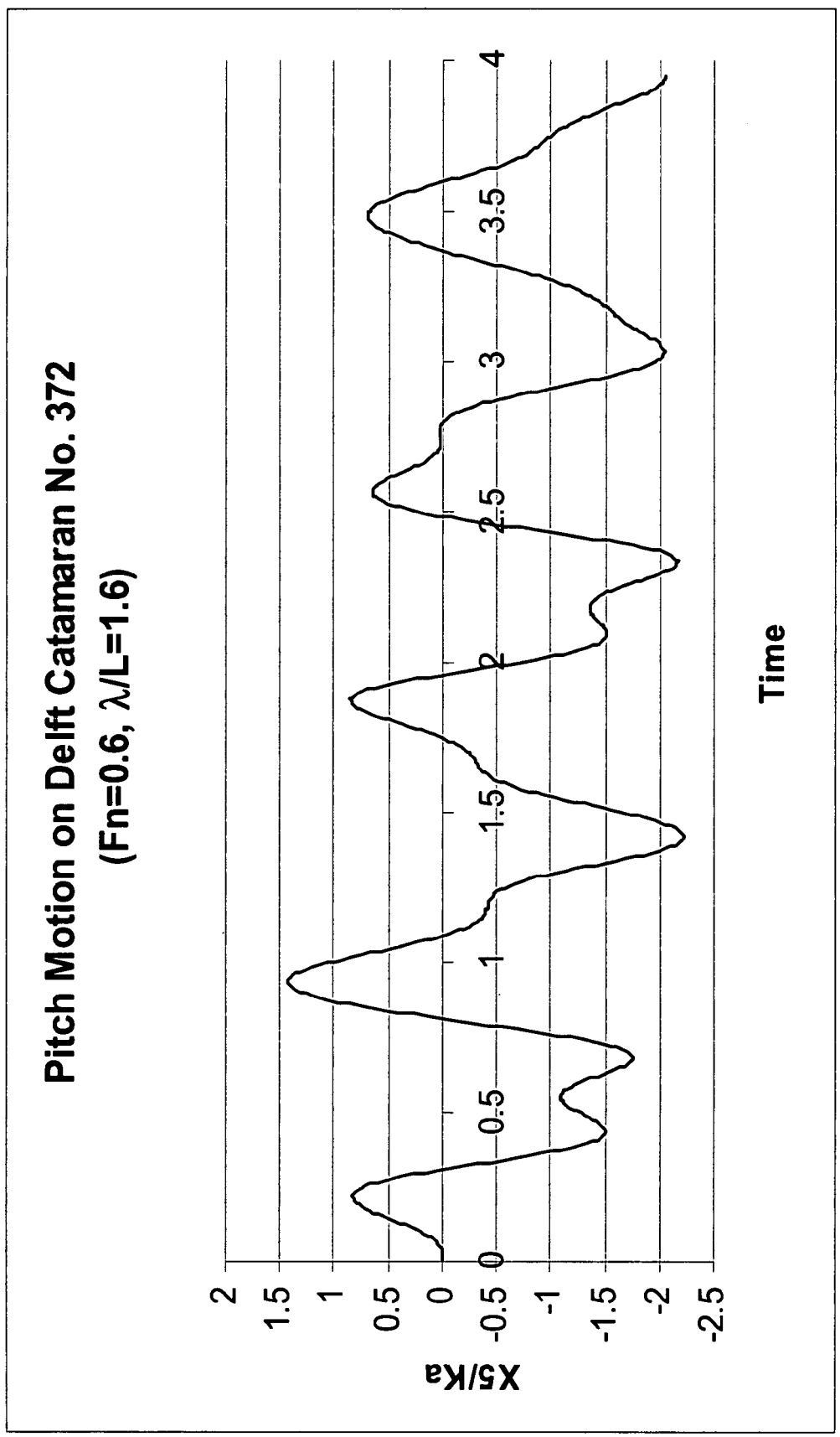
FIG. 4 is a graphical representation, similar to FIG. 2, of the pitch motion corresponding to FIG. 3 for Delft Catamaran No. 372 with $F_r$=0.6.

First are examined the properties of various forces and torques in Equation (11) and Equation (12). FIG. 1 shows, by way of example, the (non-dimensional) vertical components of the forces governing the ship heave motion for Delft Catamaran 372 at a Froude number $F_r = 0.3$. The solid line is the pressure force $F_z^p$, and the dashed linear is the buoyancy force $F_z^g$. From FIG. 1 one could observe that the two forces tend to offset each other. However, due to the phase difference (that arises from the delay in the ship response to the incident waves) between the two forces, they do not cancel exactly each other at any given time. The oscillatory net force induces the ship heave motion oscillation, as shown in FIG. 2. Similar properties can be also found in the torques acting on the ship body. Shown in FIG. 3 are the (non-dimensional) torques $\Gamma_y^p$ (solid line) and $\Gamma_y^g$ (dashed line) for the Delft model Catamaran 372 at $F_r = 0.6$. The corresponding pitch motion is shown in FIG. 4. In these two examples, the incident wave length $\lambda$ is 1.6 times the ship length $L_s$.

The present inventors benchmark the inventive ship motion model with respect to experimentation and some existing ship models. For this purpose, the ship Catamaran No. 372 is selected for various Froude numbers and incident wave lengths. As shown in FIG. 5 through FIG. 12, the inventive ship motion model results are indicated by the solid lines, the VERES model results are indicated by the dashed lines, the experimental results from the MARIN Model test are indicated by the triangular dotted lines, and the Delft Model test results are indicated by the circular dotted lines.

Figure 5:
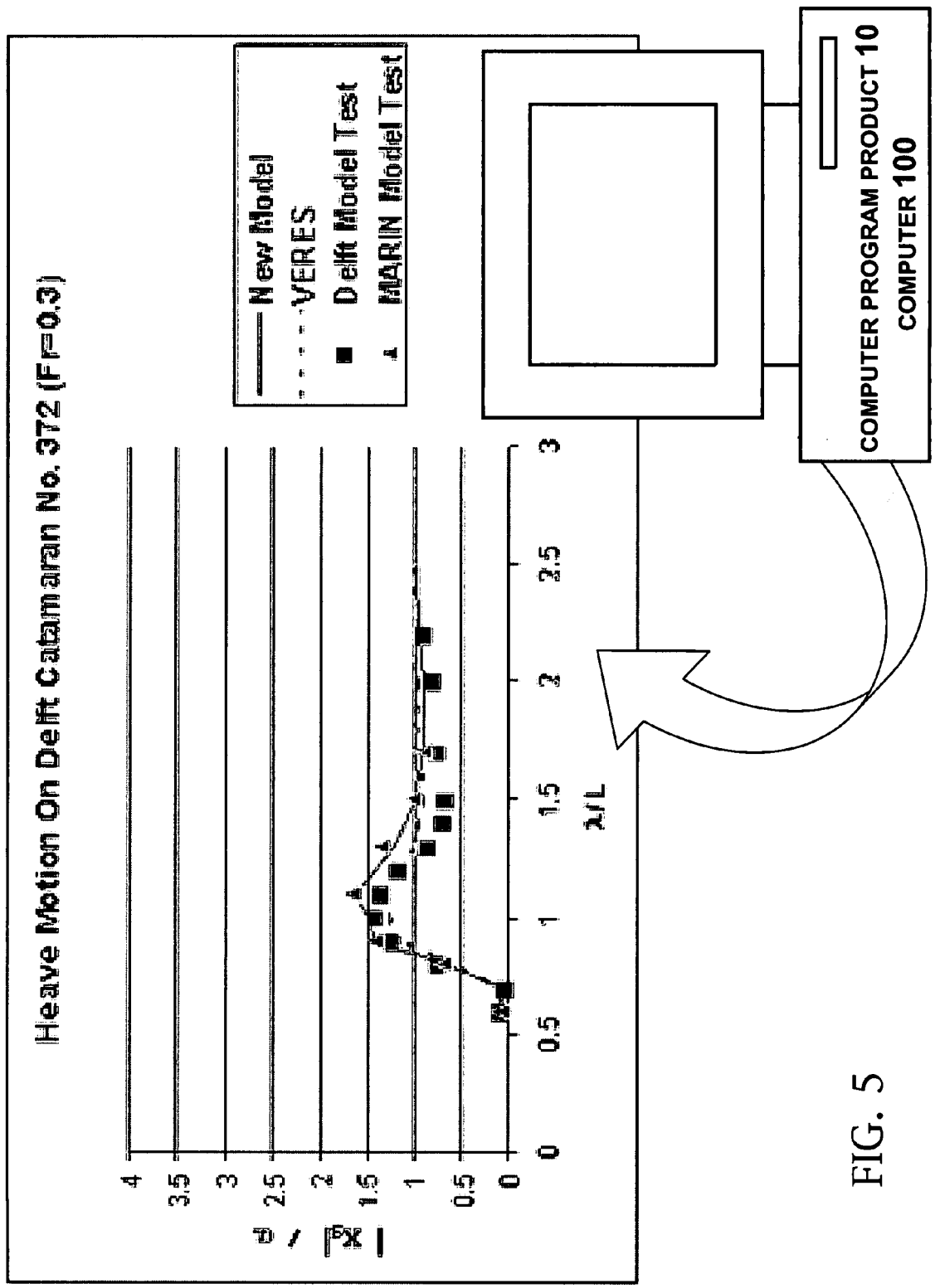
FIG. 5 is a graphical representation showing comparison of the inventive ship motion model results (the solid line), the VERES results (the dashed line), the Delft model test data (the squares), and the MARINE model test data (the triangles) for the heave motion with $F_r$=0.3.
Figure 6:
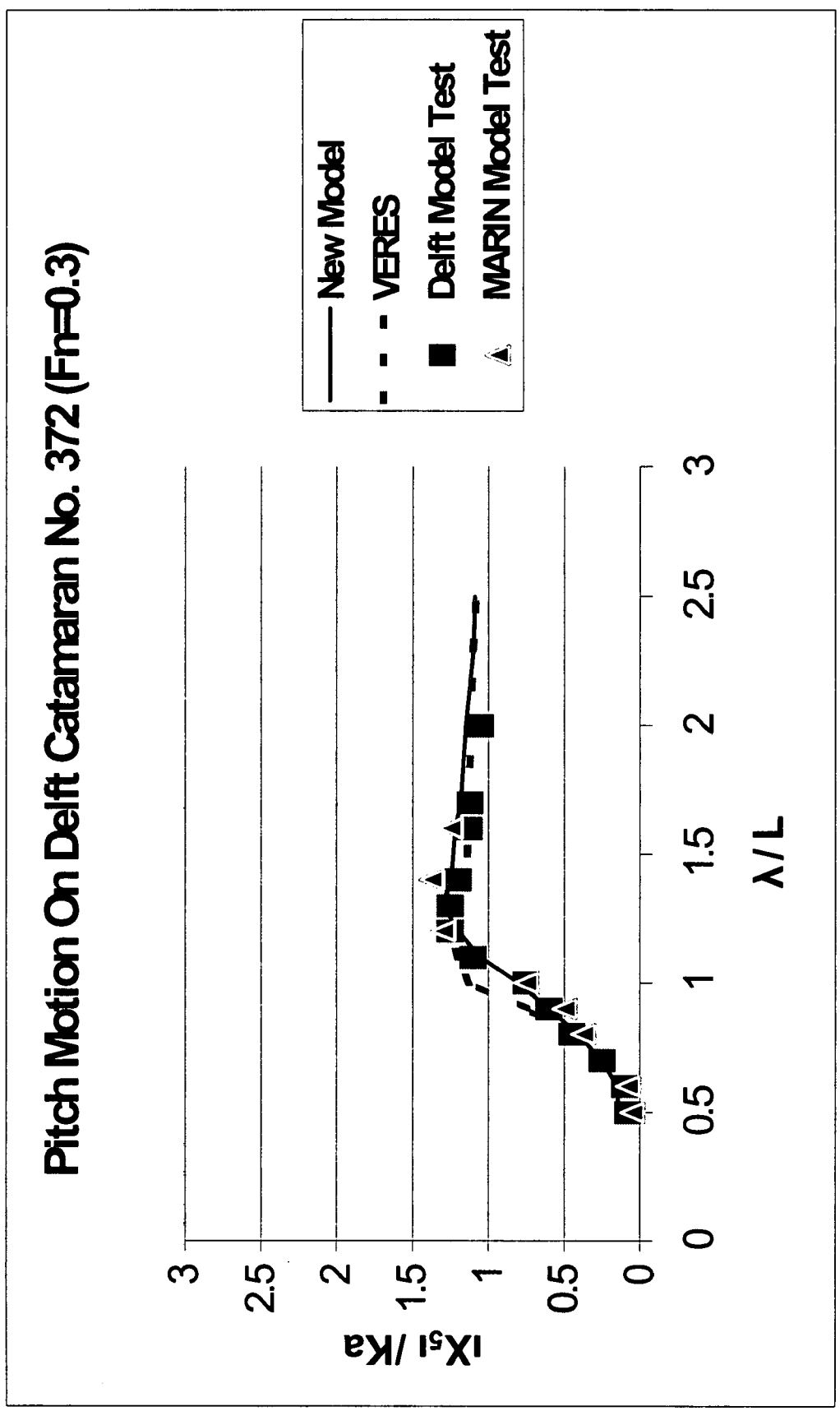
FIG. 6 is a graphical representation showing comparison of the inventive ship motion model results (the solid line), the VERES results (the dashed line), the Delft model test data (the squares), and the MARINE model test data (the triangles) for the pitch motion with $F_r$=0.3.

FIG. 5 and FIG. 6 illustrate the benchmark results from the first test on the heave motion (shown in FIG. 5) and the pitch motion (shown in FIG. 6) of the ship (Delft Catamaran No. 372) for $F_r = 0.3$ with incident waves of various wavelengths. It is observed from FIG. 5 and FIG. 6 that all results agree well.

Figure 7:
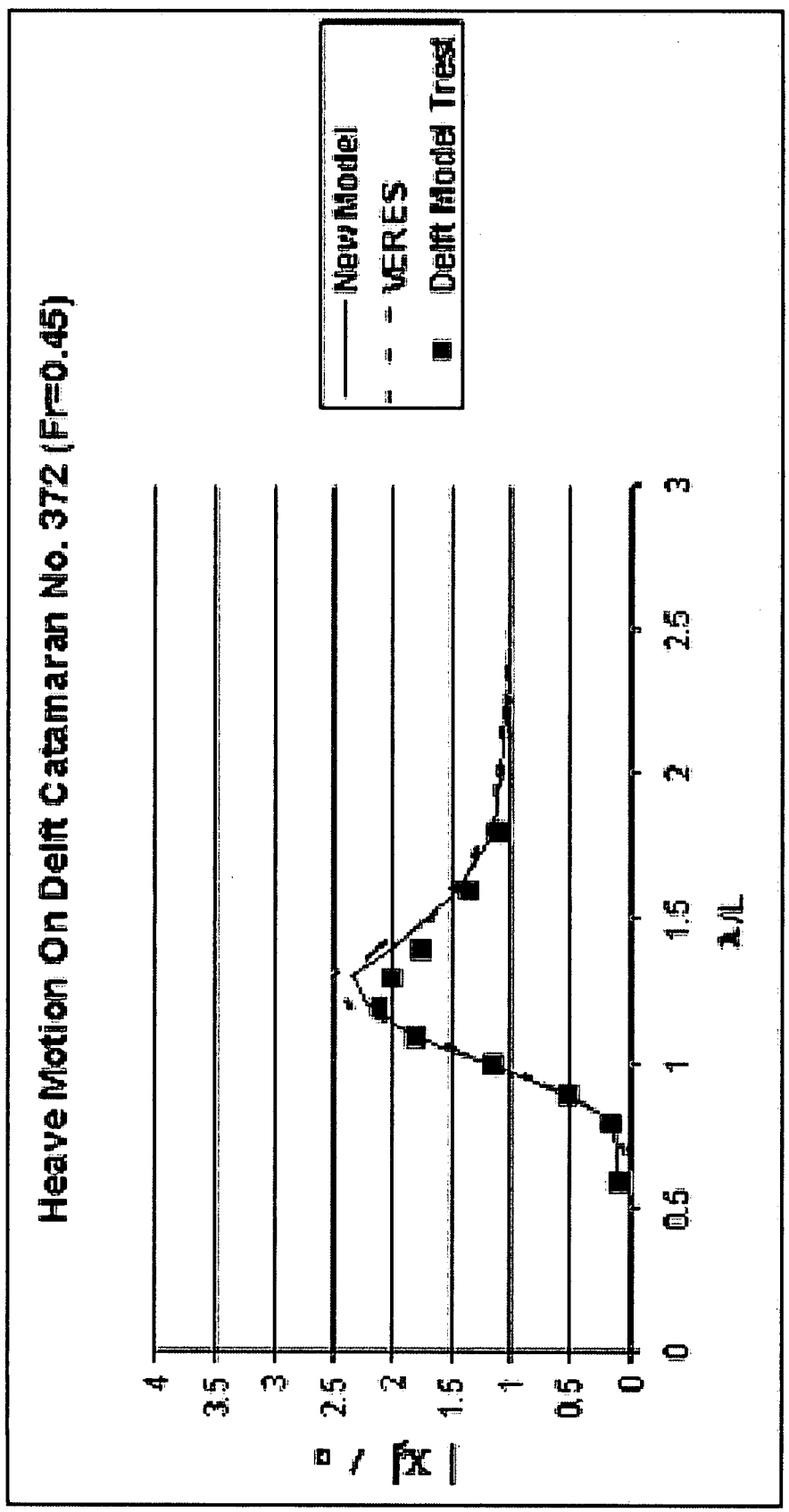
FIG. 7 is a graphical representation showing variation of the non-dimensional heave motion with the incident wavelengths for $F_r$=0.45. The solid lines are the inventive ship model results, the dashed lines are the VERES numerical results, and the squares are the Delft Model test results.
Figure 8:
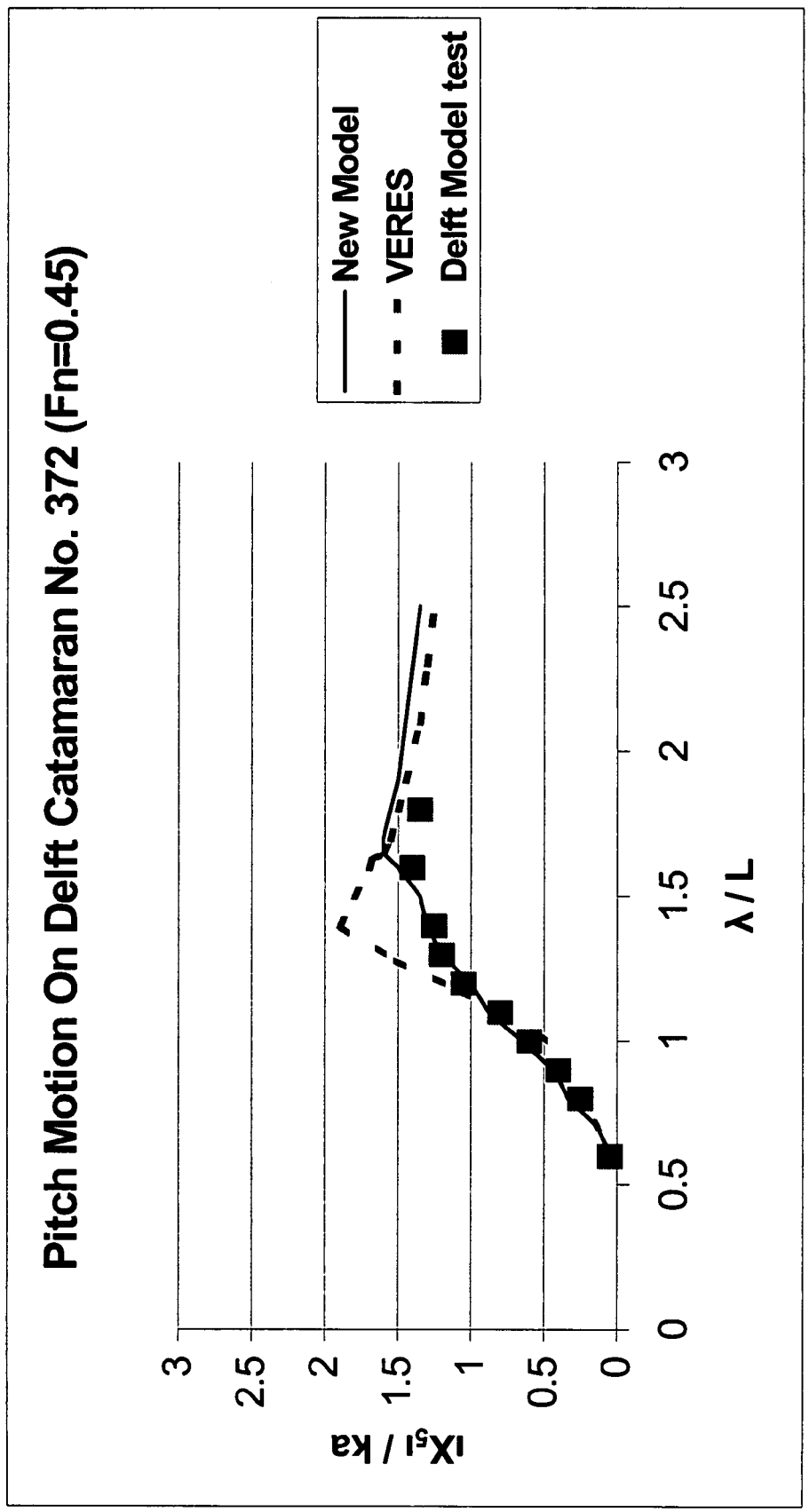
FIG. 8 is a graphical representation showing variation of the non-dimensional pitch motion with the incident wavelengths for $F_r$=0.45. The solid lines are the inventive ship model results, the dashed lines are the VERES numerical results, and the squares are the Delft Model test results.

The benchmarking results for $F_r = 0.45$ are shown in FIG. 7 and FIG. 8. The results for the heave motions, shown in FIG. 7, agree well. Some discrepancies are found, however, in the results of the pitch motion, shown in FIG. 8. In particular, when the wavelength of the incident waves is comparable to the ship length, the pitch motion amplitude from VERES is 30 percent greater than that measured in the experiment. Nevertheless, the results from the inventive ship motion model agree well with the experiment.

Figure 9:
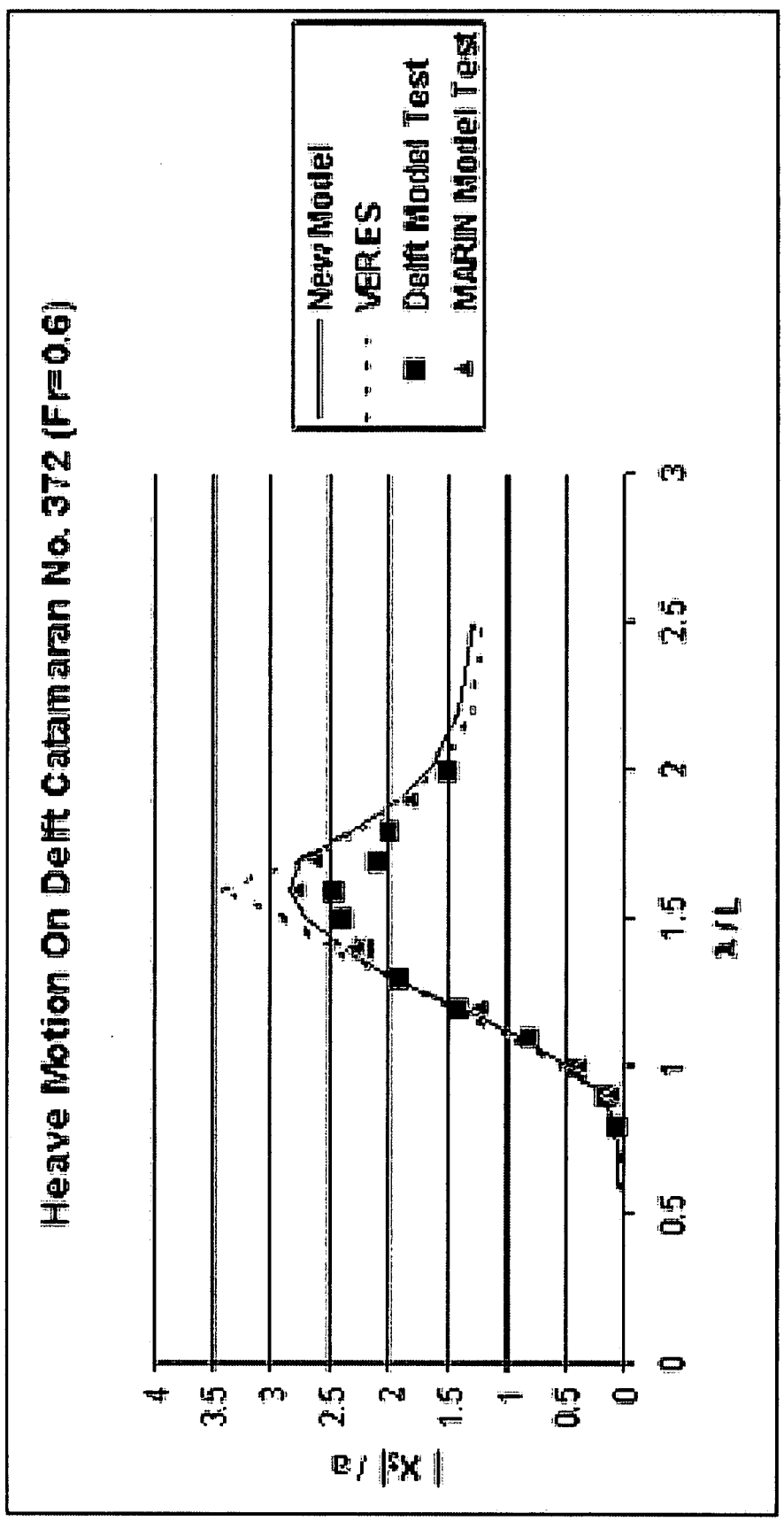
FIG. 9 is a graphical representation, similar to FIG. 7, showing variation of the non-dimensional heave motion with the incident wavelengths for $F_r$=0.6. The solid lines are the inventive ship model results, the dashed lines are the VERES numerical results, the squares are the Delft Model test results, and the triangles are the MARINE Model test results.
Figure 10:
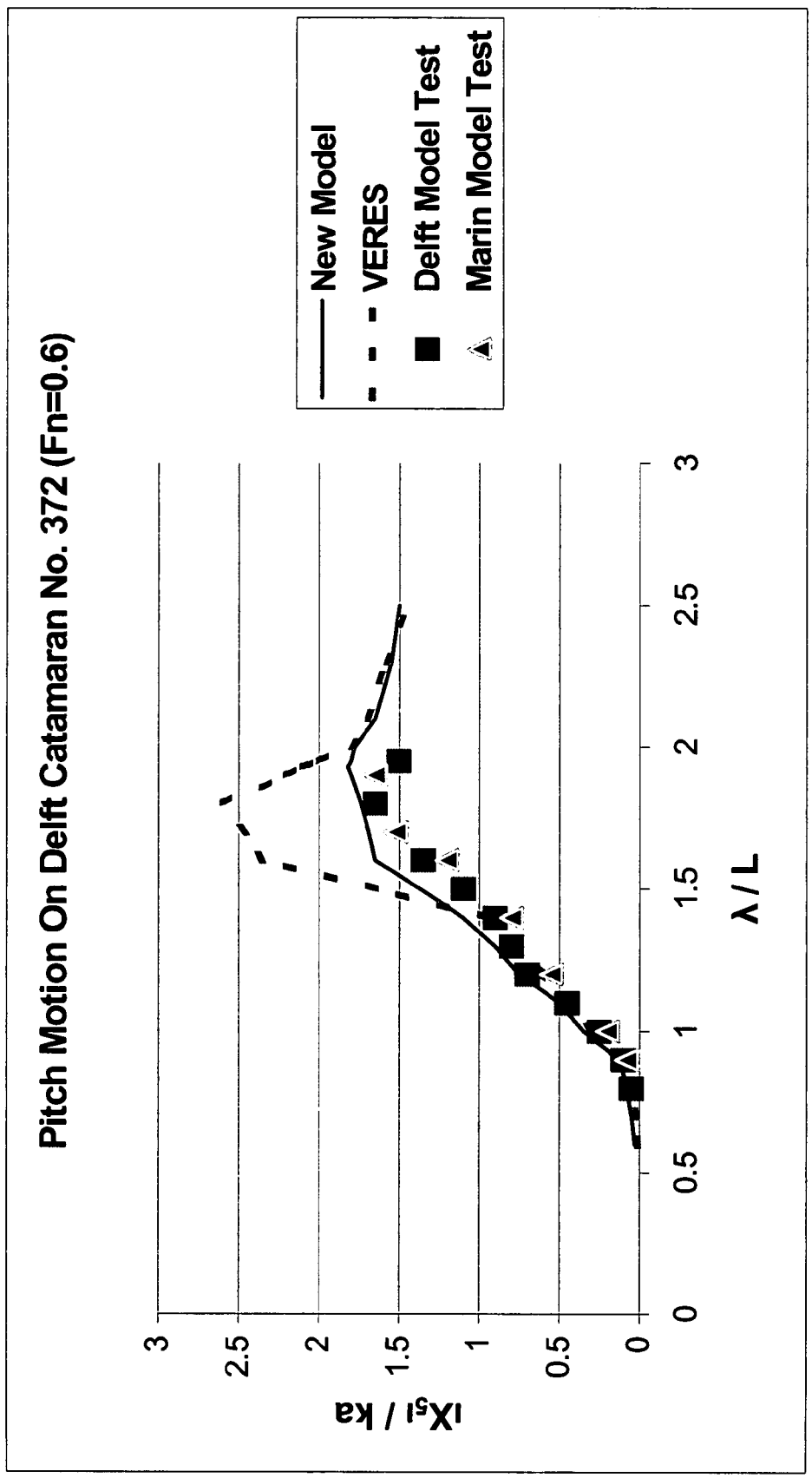
FIG. 10 is a graphical representation, similar to FIG. 8, showing variation of the non-dimensional pitch motion with the incident wavelengths for $F_r$=0.6. The solid lines are the inventive ship model results, the dashed lines are the VERES numerical results, the squares are the Delft Model test results, and the triangles are the MARINE Model test results.

The benchmarking tests illustrated in FIG. 9 through FIG. 12 more manifestly demonstrate superiority of the inventive ship motion model as compared with the VERES implementation of existing ship motion models. FIG. 9 and FIG. 10 show the results for $F_r = 0.6$. In this case, one clearly observes the significant differences between the VERES results and the experimental data. Notwithstanding the coupling of the pitch and heave motions, the differences between the numerical model results and experimental data for these two motions may not match. It is therefore appropriate to separately address the errors of these two motions. For the heave motion, the VERES results are generally about 15-20 percent different from the experiments. The difference for the pitch motion is generally even larger; that is, the amplitude from VERES is approximately 45 percent larger than that from the experiments. In contrast, the difference between the inventive ship motion model results and the experimental results are seen to be negligible in both FIG. 9 and FIG. 10.

Figure 11:
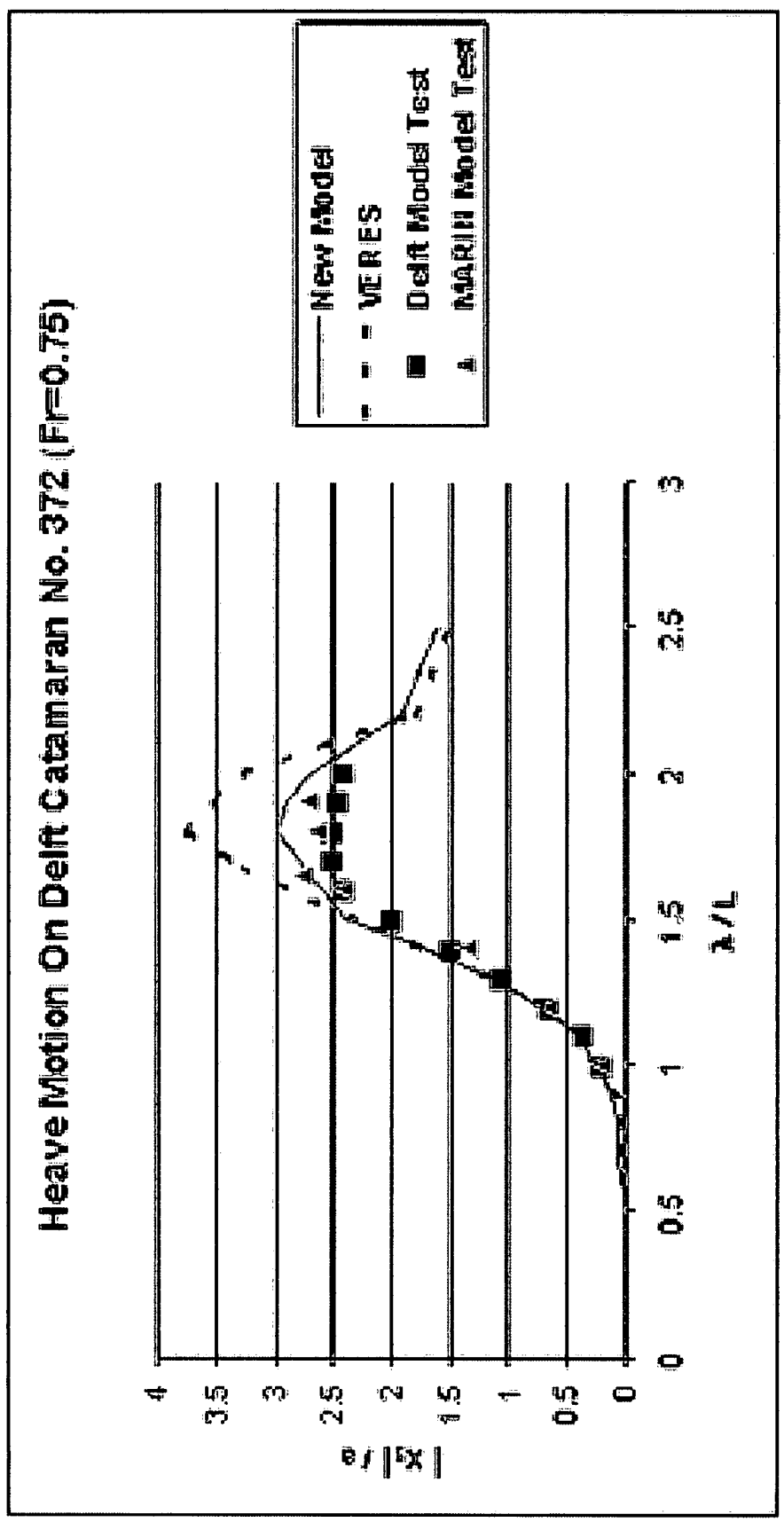
FIG. 11 is a graphical representation, similar to FIG. 7 and FIG. 9, showing variation of the non-dimensional heave motion with the incident wavelengths for $F_r$=0.75. The solid lines are the inventive ship model results, the dashed lines are the VERES numerical results, the squares are the Delft Model test results, and the triangles are the MARINE Model test results.
Figure 12:
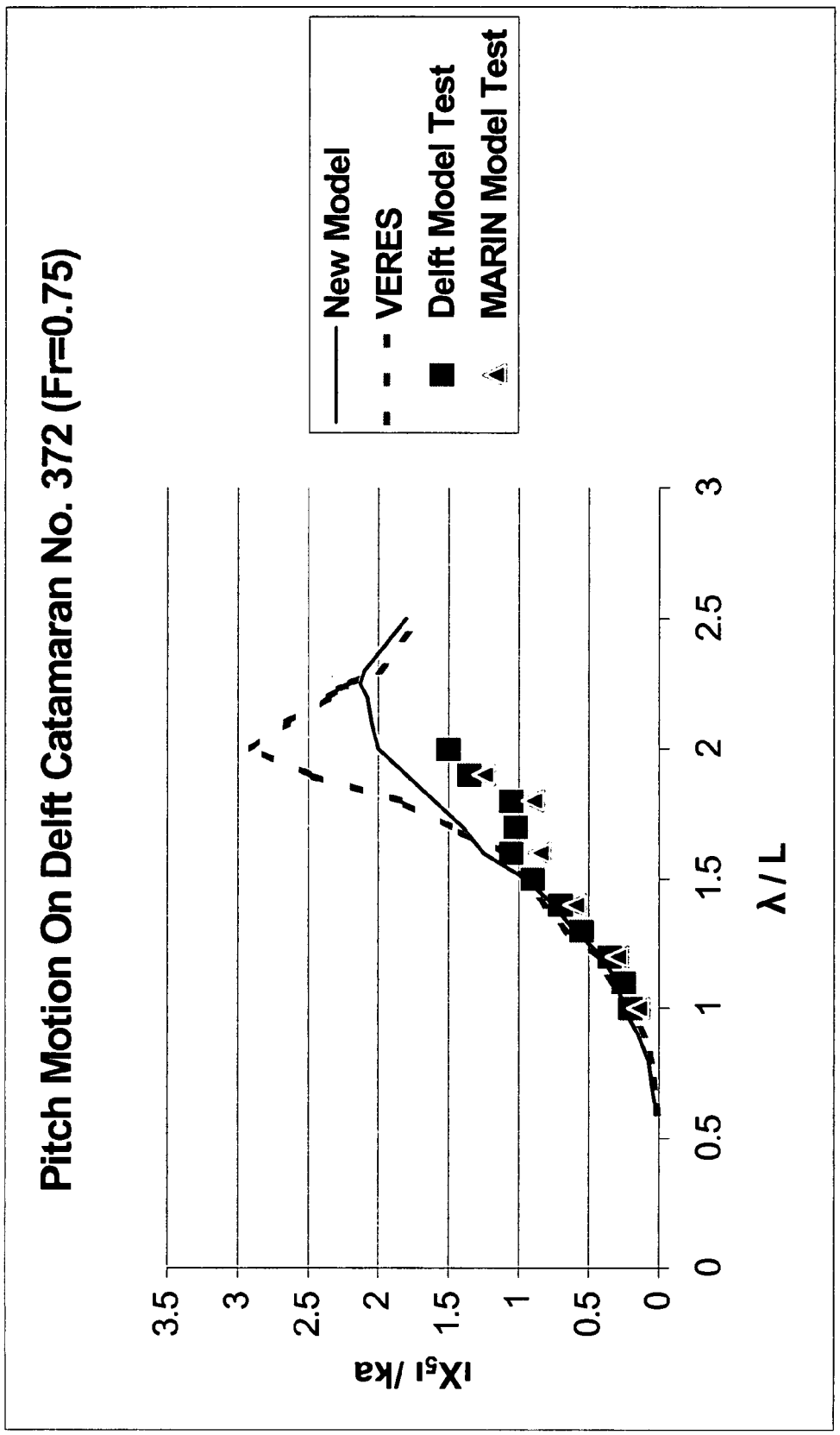
FIG. 12 is a graphical representation, similar to FIG. 8 and FIG. 10, showing variation of the non-dimensional pitch motion with the incident wavelengths for $F_r$=0.75. The solid lines are the inventive ship model results, the dashed lines are the VERES numerical results, the squares are the Delft Model test results, and the triangles are the MARINE Model test results.

For larger Froude numbers, the differences between VERES and the experiments increase with the Froude number $F_r$. When Froude numbers are larger one also begins to observe differences between the inventive ship motion model results and the experimental data. Nevertheless, even when the inventive ship motion model results and the experimental measurements appreciably differ, the difference between the inventive ship motion model results and the experimental measurements is much smaller than that between the VERES results and the experimental results. This is clearly demonstrated for $F_r$=0.75, as shown in FIG. 11 and FIG. 12. From FIG. 12 one observes that the relative difference between the VERES results and the experimental results for the pitch motion is approximately 70 percent; in contrast, the relative difference of the inventive ship motion model results is approximately 10-15 percent.

Roll Damping

Example

Roll motion is one of the most important ship responses to waves, and is very difficult to predict due to the complexity of ship-wave interaction and the sensitivity thereof to ship bilge keels and appendages. This sensitivity needs special attention, both in modeling corresponding physical processes and in numerical treatment. One important process in this regard is the roll damping. Without an appropriate roll damping model, accurate prediction of ship roll motion is inconceivable.

There have been several theoretical and experimental attempts to model the roll damping in the past. G. H. Bryan (1900) was perhaps one of the first researchers to study the bilge keel's effect. Forty years later, R. W. L. Gawn (1940) made a significant contribution with his studies on roll damping in still water. Later, T. Hishida (1952, 1954, 1955) provided a theoretical model on the roll damping for ship hulls in simple oscillatory waves. M. Martin (1958), N. Tanaka (1957, 1958, 1959, 1961), H. Kato (1965), C. G. Moody (1961), L. E. Motter (1967), and H. Jones (1978, 1979) provided experimental results on the bilge keels' effect. Several efforts tried to address the effect of ship speed on roll damping. Y. Watanabe and S. Inoue (1957) first tested the roll damping effect at zero ship speed. Later, Y. Yamanouchi (1961), W. E. Bolton (1972) and R. F. Lofft (1973) tested the damping with finite forward ship speed. Their findings, as well as many others, showed that there are considerable differences between the experimental data and the existing theoretical results. With the linear strip theory, Y. Himeno (1981) improved the theoretical model with his roll damping coefficients which have, to date, been widely used. However, as Himeno himself acknowledged, the roll damping process is still not fully understood. One reason that understanding of the roll damping effect is hindered is the nonlinear interaction between ship body and surrounding fluid (including waves). This nonlinear interaction affects not only ship motion, but also (and perhaps more importantly) the underwater ship volume.

Appropriate modeling of roll damping is one of the key issues in accurately predicting ship roll motion. The difficulties in modeling roll damping arise mainly from the nonlinear nature of the phenomenon. Roll damping depends strongly on the nonlinear waves (incident waves and ship motion generated waves), and on the interactions among the waves and between the waves and the ship body. In addition, roll damping depends strongly on the underwater geometry of the ship. The underwater geometry changes over time because a ship water line (defined in calm water) does not apply to a moving ship; rather, its underwater volume depends on ship motion speed and on the interactions between the ship body and surrounding waves.

The present inventors have derived a better roll damping model from the basic equations of fluid motions. Their new, dynamically consistent, bilge keels roll damping function reduces the effect of the empirical or linear parameters. In a general context, a flow passing by a solid object is different from that without the object, as can be observed from different streamlines of flow. This difference is often called, by geophysicists, the "blocking effect" of the object on the flow. There is a long history of studying blocking mechanisms in a wide variety of fluid systems. In this study, the present inventors use the term "blocking effect" for the net pressure force on the surface. The inventive approach in this regard is based on the studies of the blocking mechanisms of an object in potential flow. The interaction of a ship body with the surrounding flow possesses similar physical characteristics; however, this situation is much more challenging because the underwater ship geometry—e.g., the solid object interacting with the flow—changes in time. This change depends on the interaction, as well. Still, the potential benefit of this inventive approach is great, as the derived damping function is independent of the ship hull. According to this inventive approach, the hull geometry effect is described explicitly by a variable in the function; so are other environmental conditions, such as sheep motion state, incident waves, and wave breaking mechanisms.

(i) Roll Damping: Relationship between Ship Geometry and Ship Motion

In a linear parameterized model, the underwater ship geometry is assumed unchanged in determining ship responding motion; see A. R. Magee and R. F. Beck, *Compendium of Ship Motion Calculations Using Linear Time-Domain Analysis,* 1988, page 192. In reality, the underwater geometry does change according to the ship's solid body motion. In accordance with the present inventors' modeling methodology, such change is naturally incorporated; its effect on ship motion and on ship-wave interaction can be identified in the inventive numerical results. The impact of time-varying underwater ship geometry on ship motion is isolated as explained hereinbelow.

It is well known that the response of a solid body to external forcing is strongest when the forcing frequency resonates with the intrinsic or natural frequency of the solid body. The ship intrinsic frequencies in water can be determined similarly as for a pendulum. Given an initial ship position in calm water that is away from its equilibrium position, it will oscillate (rotate or move vertically) according to the buoyancy force, e.g., the restoring forces in Equation (11) and Equation (12). In numerical simulation, the responses are described by a time series of related quantities (e.g. velocity potential, or rotating angles). The intrinsic frequency can be obtained from the time series via Fourier transform.

Figure 13:
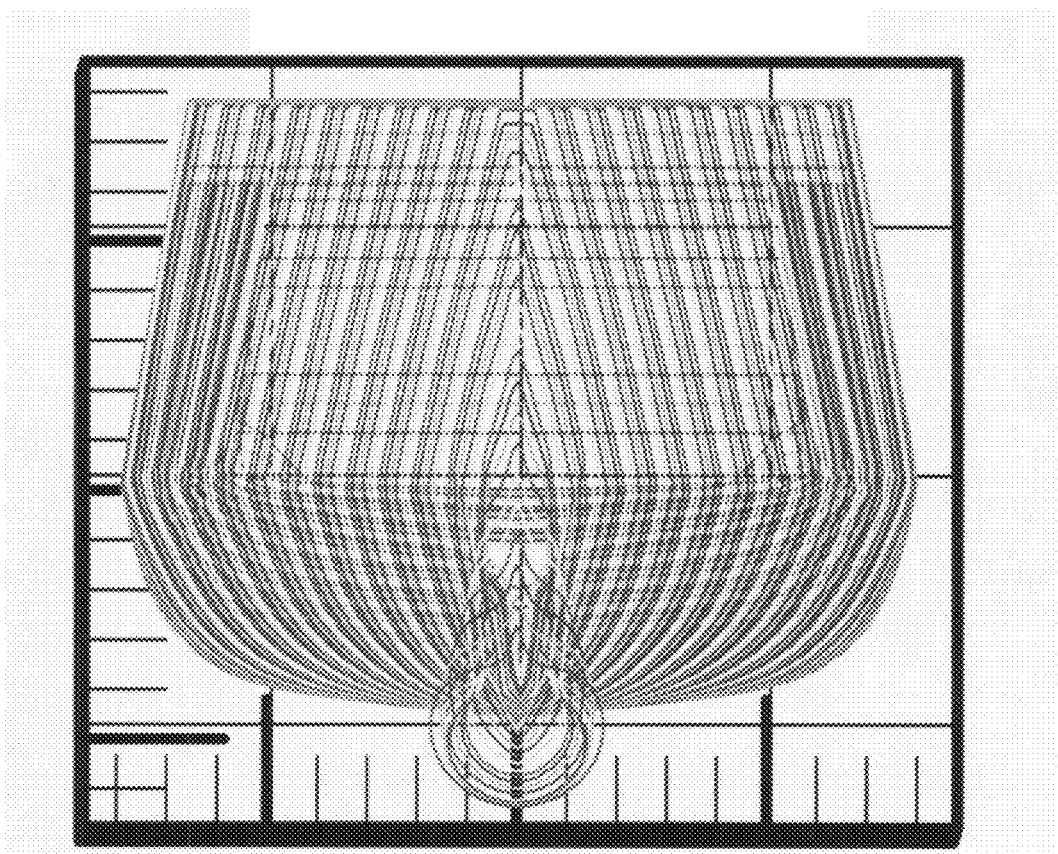
FIG. 13 is a computerized transverse-view diagram, generated by the Office of Naval Research (ONR), of a tumblehome hull.
Figure 14:
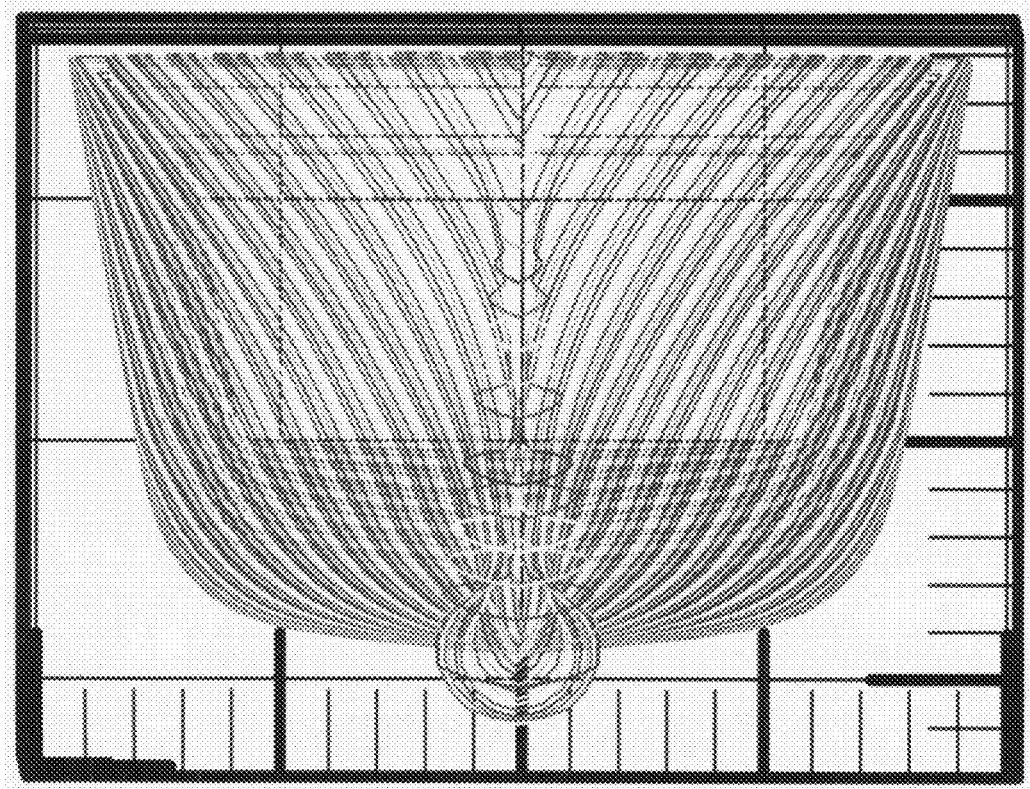
FIG. 14 is a computerized transverse-view diagram, generated by the Office of Naval Research (ONR), of a flared hull.

The whole ship geometry, not only the part below the water line, is necessary to correctly determine the natural frequencies of the ship under consideration. To demonstrate this numerically, the present inventors selected two ship hulls, viz., the ONR tumblehome hull (FIG. 13) and the ONR flared hull (FIG. 14). The respective geometries of the two hulls under the calm water line are identical, but their respective geometries above water are different. Above the calm water line, the sidewall of the tumblehome hull tilts 10° inward as depicted in FIG. 13, and the sidewall of the flared hull tilts 10° outward as depicted in FIG. 14.

Figure 15:
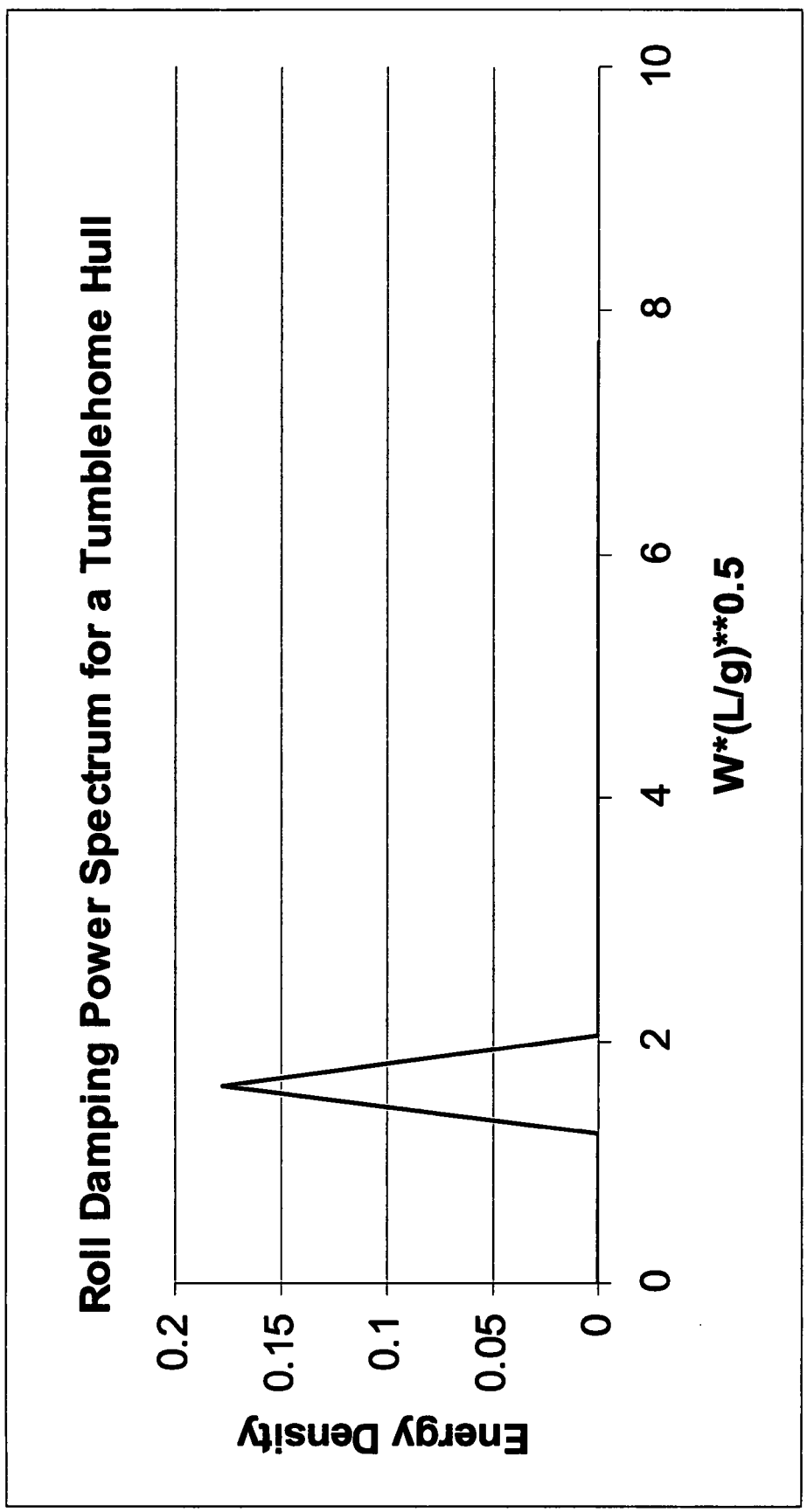
FIG. 15 is a graphical representation of the roll damping power spectrum for the tumblehome hull with the initial angle $\pi/5$.
Figure 16:
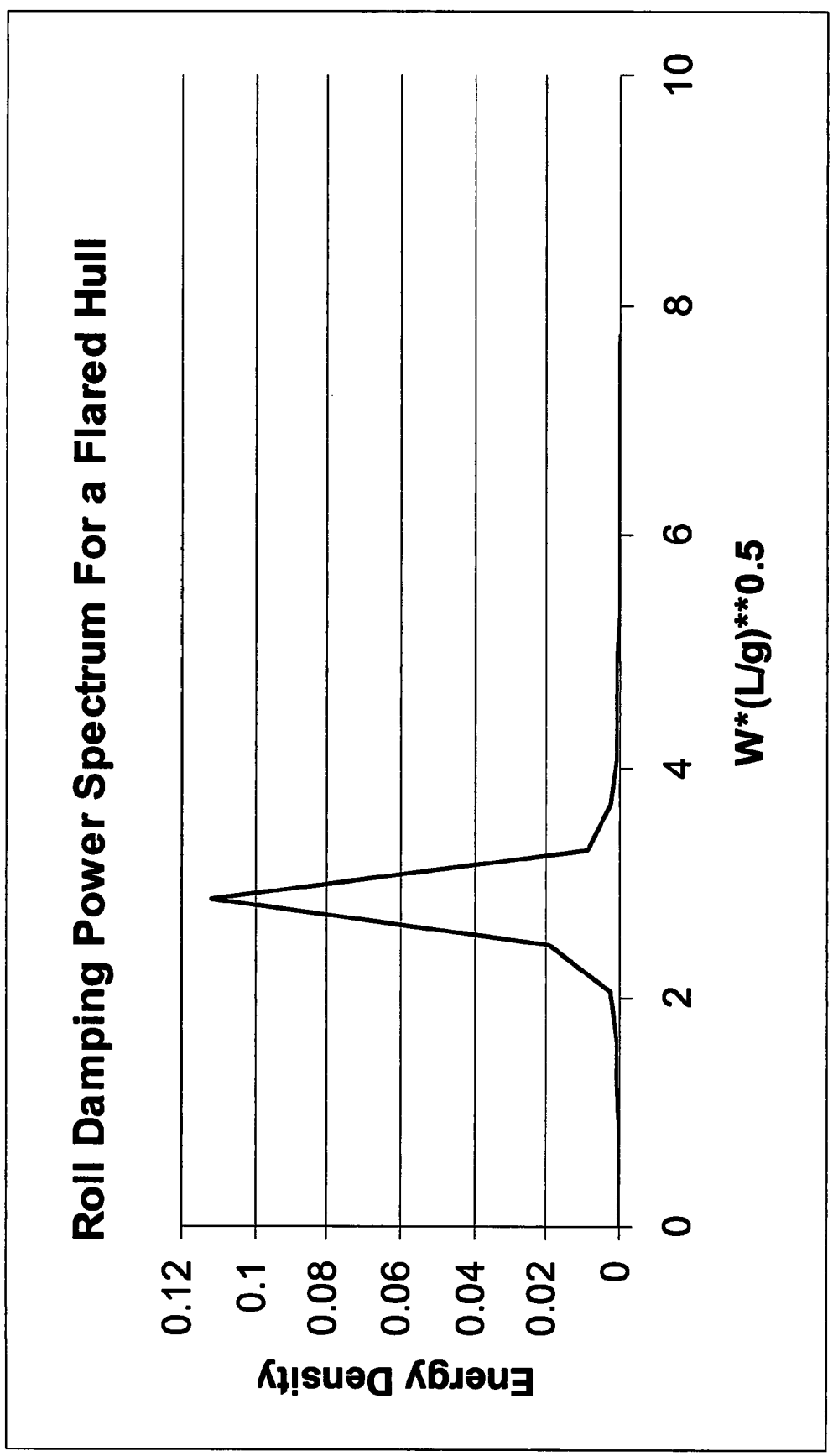
FIG. 16 is a graphical representation of the roll damping power spectrum for the flared hull with the initial angle $\pi/5$.

Linearized ship motion models would yield the same intrinsic frequencies for the tumblehome hull and the flared hull, as the underwater line geometries are identical. However, the inventive ship motion model results indicate otherwise, since the inventive ship motion takes the entire ship geometry into consideration. The intrinsic roll frequencies of the two hulls are shown in FIG. 15 (tumblehome hull) and FIG. 16 (flared hull). From FIG. 15 and FIG. 16 one can observe clearly that the intrinsic frequency of the tumblehome hull is lower than that of the flared hull. Without correct intrinsic frequencies, one would not be able to correctly determine ship responses to external forcing on the ship. These numerical results hence demonstrate that the complete ship geometry is important for correct modeling ship motion, in particular near the resonant conditions.

(ii) Roll Damping: Roll Damping Function

Real and experimental ship hulls often include appendages, such as bilge keels, rudders, etc. The appendages produce roll damping that can reduce ship roll motions by as much as 10-20%. It is thus important that roll damping be implemented into numerical models. See Y. Himeno, *Prediction of Ship Roll Damping—State of The Art*, Report No. 239, Department of Naval Architecture and Marine Engineering, University of Michigan, Ann Arbor, Mich., September 1981.

To balance numerical accuracy and efficiency, naval architects have developed many simple, parameterized roll damping models. For example, Himeno (1981) suggested the following linearized roll damping coefficient:

$$B_\phi(\dot\phi) = B_e \dot\phi \quad (17)$$

The roll damping function $B_\phi(\dot\phi)$ is linearly proportional to the rotation rate $\dot\phi$ with a constant damping coefficient $B_e$. Himeno (1981) also suggested a more sophisticated coefficient for simple oscillation with a frequency $\omega$, $$B_e = B_1 + \frac{8}{3\pi}\omega\phi_A B_2 + \frac{3}{4}\omega^2 \phi_A^2 B_3, \quad (18)$$

where $B_{1,2,3}$ are constants, and $\phi_A$ is the constant roll motion amplitude that is pre-calculated by his linear strip theory. The damping coefficient $B_e$ is constant, given a frequency $\omega$, and the $\phi_A$.

Figure 17:
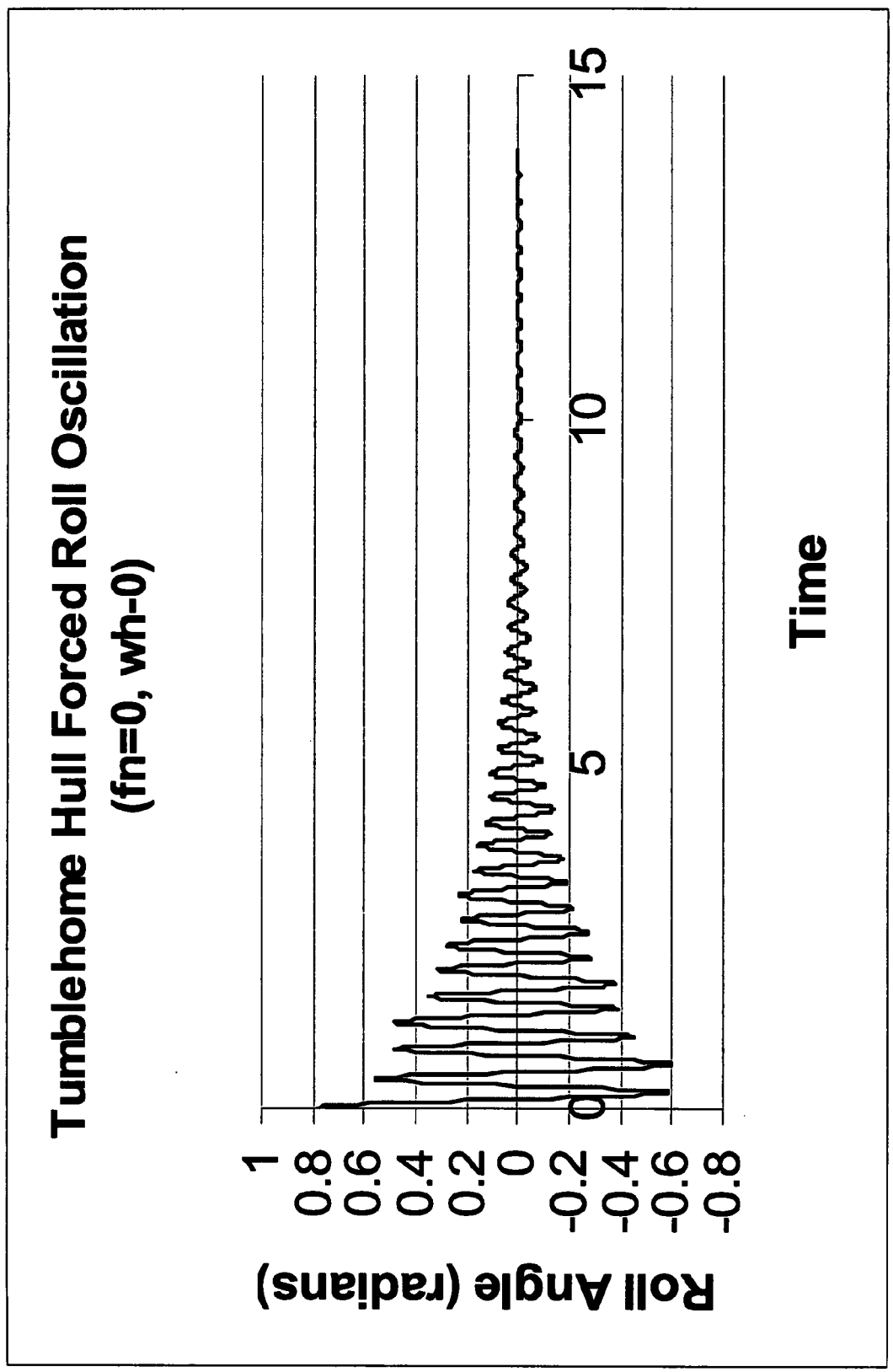
FIG. 17 is a graphical representation of the roll damping of the tumblehome hull with bilge keels. The bilge keel effect can be measured by the amplitude difference between the two adjacent oscillating peaks.

According to an earlier approach by the present inventors, the roll damping coefficient is determined by the difference of the two adjacent wave peaks (or valleys) of the free roll oscillation (with a finite initial departing angle) in calm water. An example of such oscillation is shown in FIG. 17. Nevertheless, this approach, though simple and nonlinear in nature (and thus better than linearized results), is itself limited in its failure to account for possible dependencies of the coefficient on roll oscillation frequency. This could create serious problems when ships are not in calm water. In more realistic situations, ships roll with a wide spectrum of frequencies. The damping coefficient derived from a single (intrinsic) frequency is simply not sufficient.

This has prompted the present inventors to search for a more realistic approach to model roll damping effect. Various aspects of existing methodologies are incorporated into the present invention's approach. For instance, the inventive approach borrows a notion from the classical analysis of blocking effect of a solid object in a flow; see L. D. Landau and E. M. Lifshitz, *Fluid Mechanics: Course of Theoretical Physics*, Butterworth and Heinemann, Ch. 6, page 539 (1999). This approach has been applied to many fluid systems, e.g., an object in stratified fluid (D. D. Freund and R. E. Meyer, "On the Mechanism of Blocking in a Stratified Fluid," *J. Fluid Mech.*, Vol. 54, pp 719-744, 1972), wind past a two-dimensional terrain (S. T. Garner, "Blocking and Frontogenesis by Two-Dimensional Terrain in Baroclinic Flow. Part II: Analysis of Flow Stagnation Mechanisms," *J. Atmos. Sci.*, Vol. 56, pp 1509-1523, 1998), and current past seamount (Ray-Qing Lin and W. L. Thomas III, "Ship Stability Study in the Coastal Region: New Coastal Wave Model Coupled with a Dynamic Stability Model," Twenty-Third Symposium on Naval Hydrodynamics, Val De Reuil, France, 17-22 Sep. 2000, National Academy of Sciences Press, 2001). Bilge keels on ship hulls play a role similar to a seamount in the ocean. This suggests to the present inventors the importation of elements for the problem being addressed by the present invention. However, the present problem differs from the seamount problem insofar as, in the present problem, the underwater parts of the bilge keels (e.g., two bilge keels) vary in time as the ship moves in water.

The inventive approach does not solve the present problem directly via numerical model (for the fundamental equations of the fluid mechanics). Instead, the inventive approach is "quasi-analytical" in nature in that certain simplified mathematical formulations are used to derive the damping function. The price paid by the inventive approach, as it is frequently embodied, is that not all nonlinear damping effects are included. To include the fully nonlinear effects of the appendages according to inventive practice, one could use a coupled system, such as the present invention's nonlinear ship motion model coupled with a fully nonlinear viscous flow model (e.g. RANS); however, this can be, computationally, very time consuming or even impractical.

According to the inventive approach, generally, the roll damping can be evaluated from the torque arising from the pressure acting on the blocking area $\overline{A}_{block}$, $$(\Gamma_{block})_i = -\rho \int_{\overline{A}_{block}} (r \times n)_i P_{(s)} ds = D(t)\frac{d\theta_i}{dt}. \quad (19)$$

where $D(t)$ is a time-varying, nonlinear damping function arising from the bilge keels' blocking effects. The negative sign implies that it will be deducted from the torques acting on the ship body. However, direct evaluation of Equation (19) requires correct knowledge of the pressure at the surface, which then depends on the specific geometric properties of the bilge keels, and the corresponding dynamic state of the system. While feasible, it can be very demanding numerically because very fine numerical grids are necessary to resolve the small scale processes.

To avoid such difficulties, the present inventors borrow the following idea from previous studies of blocking mechanisms: The blocking effect can be included by deducting an effective blocking area $A_{block}$ [not $\overline{A}_{block}$ in Equation (19)]

from the ship wet surface $\Sigma_i$ in the integral for the torques on the ship body:

$$\Gamma_{rotat_i}^{I+D+R} = -\int\int_{\Sigma_i - A_{block}} d\Sigma(x_s - x_c) \times nP, \ i = 4 \quad (20)$$

Now the problem is to determine the effective blocking area $A_{block}$.

In the inventive approach, the effective blocking area is approximated as $$A_{block(t)} = W_{block} * H_{bk} L_{bk}(t), \quad (21)$$

where $H_{bk}$ and $L_{bk}$ are the width of the span and the underwater length of the bilge keel, respectively. $L_{bk}$ varies with time because part of the bilge keels can be above water when the ship moves. The underwater length $L_{bk}$ can be evaluated via $$L_{bk}(t) = \sum_{j=J_1(t)}^{J_2(t)} \delta l_j R_j(t), \quad (22)$$

where $J_1$ and $J_2$ are the two time-varying end grid points of the underwater bilge keel, $\delta l_j$ is the length segment at the grid point j, and $R_j(t)$ is the underwater percentage of $\delta l_j$. The time variation of the quantities depends on the ship's motion and surrounding waves. $W_{block}$ is a dynamic factor used to describe other geometric and dynamic effects, such as the effective blocking area width (depending on $H_{bk}$ and the complexity of flow near the ship boundary).

There is no existing result on modeling $W_{block}$. Therefore, the present inventors start from the physical intuition and typical approaches in nonlinear theory. Intuitively, one could argue that the larger the rolling angle and the faster the oscillation, the larger the effective blocking area. This implies that, in the simplest form:

$$W_{block} = c_1 \theta_m \omega \quad (23)$$

where $\theta_m$ is the rolling angle magnitude and $\omega$ is the rolling frequency. On the other hand, general multi-scale analysis (C. M. Bender and S. A. Orzag, *Advanced Mathematical Methods for Scientists and Engineers*, Chapter 1, starting page 593, "Asymptotic Methods and Perturbation Theory," Springer, N.Y., 1972) demonstrates that nonlinear effects can be modeled by adding higher order terms (as the power of 2n) in Equation (23):

$$W_{block} = c_i(\theta_m \omega)[1 + a_1(\theta_m \omega)^2 + a_2(\theta_m \omega)^4 + a_3(\theta_m \omega)^6 + \ldots] \quad (24)$$

$$= \sum_{k=0}^{K} c_{2k+1}(\theta_m \omega)^{2k+1}$$

up to some given truncation order K.

Since the roll motions are in general more complicated than a simple oscillation, there is a wide spectrum of oscillating frequencies. These frequencies are often related to those of external forcing. In this application of the present invention, the external forcing is provided by incident waves. To properly account for the contributions from individual oscillating modes, the present inventors replace the single frequency $\omega$ in Equation (24) with a weighted distribution over the incident wave frequency domain:

$$\omega \to \sum_{i=0}^{N} \omega_i \frac{A_i}{A}, \quad (25)$$

where A is the total amplitude of the incident waves, $A_i$ are those of individual modes with the frequencies $\omega_i$, and N is the number of individual modes of the incident waves.

In the present inventors' analysis, K=3 is chosen. Of course, K can be chosen differently in other applications. Generally, the principle is that K should be larger for stronger nonlinearity, but there is no established theory for selecting an optimal K. The coefficients $c_{2k+1}$ in the expansion Equation (23) depend on the nonlinearity of the physical problem (e.g., the nonlinear equations of the system). It decreases as k increases.

From Equation (24) we can observe that the coefficient $c_{2k+1}$ describes the nonlinear effect of the mode $(\theta\omega)^{2k+1}$, which is proportional to $\alpha^{2k+1}$ ($\alpha$ is the typical magnitude of $\theta\omega$). However, we set the coefficients to be normalized in our study, i.e., $$\sum_{k=0}^{\infty} c_{2k+1} = 1,$$

so that the magnitude variation is only described by $\theta\omega$ (similar to the scaling approaches). This normalization thus requires $\alpha=\frac{1}{2}$, i.e., $c_{2k+1}=2^{-(k+1)}$.

The formulation Equation (24) of $A_{block}$ is generic; that is, it is derived without any assumption on ship and environment properties. Therefore, it can be applied to arbitrary ships in arbitrary environment. The coefficients $c_{2k+1}$ are constants because of our normalization assumption. Therefore, the rolling angle $\theta_m$ in Equation (24) depends on the ship body characteristics, the ship motion state (e.g., speed, rotation), and the environment (e.g., incident waves, ship motion-generated waves, kinematics dissipation, and wave breaking processes).

It is pointed out again that, since it depends on many characteristics, $\theta_m$ must be determined via solving a coupled ship motion-surface wave system. This is what the present inventors accomplish in their experimental numerical simulations that they style "DiSSEL," previously discussed herein. DiSSEL represents a synthesis of their inventive ship models. The "DiSSEL_SW" component of DiSSEL models fully nonlinear ship-wave interactions. The "DiSSEL_SB" component of DiSSEL models six-degree, ship solid body motions. In terms of its computations, the DiSSEL prototype can be summarized as follows: First, an initial state is estimated from the peak of the incident wave (in the ship coordinate). Then, the full system (without the bilge keels) is solved from the initial state via numerical time integration. The simulation stops when the system reaches to a well-developed, dynamically stable state. The rolling angle amplitude $\theta_m$ is then determined from the stable state.

The effective blocking area $A_{block}$ is in general larger than the real blocking area $\overline{A}_{block}$. In the inventive model, the additional area is added in the down-stream side of the bilge keels. Since the roll motion is oscillating with time, therefore the down-stream is oscillating with time. Therefore, both the size and the location of $A_{block}$ are well defined. The expansion Equation (17) is consistent in format with other approaches in modeling solid body motion with damping effects; see E. Kreyszig, *Advanced Engineering Mathematics*, John Wiley and Sons, New York, 1983, p 988.

It is pointed out that the roll damping is strongly associated with the time-varying underwater geometry. For example, $W_{block}$ decreases as the bilge keels rise above the water; an extreme case is that $W_{block}=0$ when the bilge keels are completely above water.

(iii) Roll Damping: Roll Damping Results

To examine the present inventors' damping function model, described hereinabove, the present inventors used their DiSSEL ship motion model to study roll motion of two ONR-form ship hulls, viz., tumblehome hull and flared hull. As previously described herein, the present inventors' DiSSEL ship motion model includes two components, viz., "DiSSEL_SW" and "DiSSEL_SB." The ship-wave interaction is modeled in the DiSSEL_SW component. Ship solid body motion under the influence of the interaction is modeled in the DiSSEL_SB component.

The tumblehome hull and the flared hull were selected by the present inventors for these studies because these two hulls have different above-waterline geometries (the waterline being defined in calm water), and because of the availability of experimental data in the David Taylor Model Basin (DTMB) laboratory (West Bethesda, Md.) to use for benchmarking the present invention's numerical results. The two problems that the present inventors focused upon in these studies of the bilge keels roll damping effect were (i) the impact of above-calm-water-line ship hull geometry on roll motion and (ii) the blocking effect of the bilge keel. The present inventors used their DiSSEL ship motion model to test the significance of their roll damping function in predicting ship roll motion. Their numerical experiment demonstrates clearly that the implementation of this roll damping component improves significantly the accuracy of numerical model results, as compared with the ship experiment data from the NSWCCD Maneuvering and Seakeeping Facility.

Figure 18:
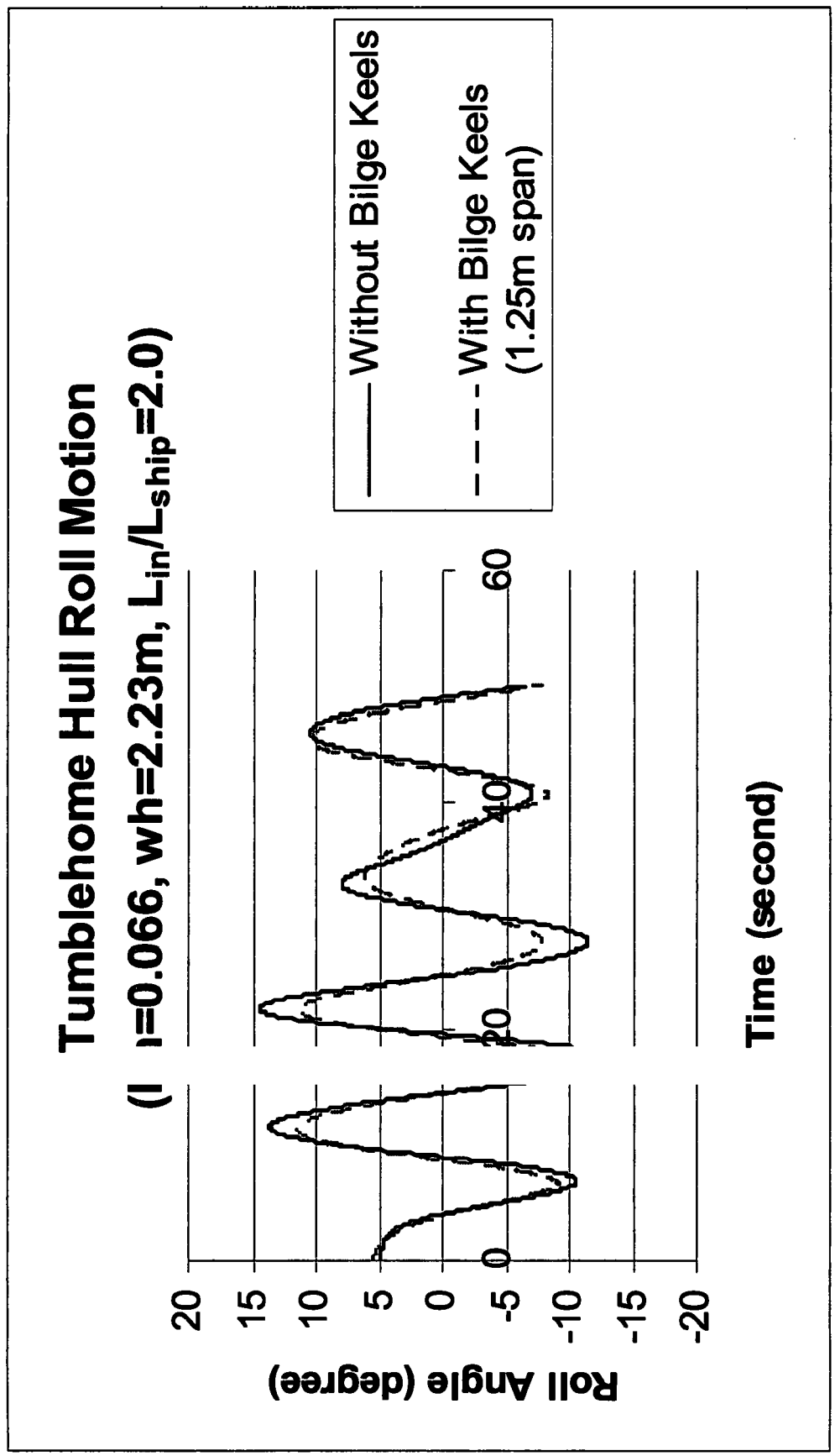
FIG. 18 is a graphical representation of the tumblehome hull roll motion time series for Fn=0.066, wave amplitude=2.23 m, λ=2.0 (incident wavelength/ship length). The solid line is the roll motion without the bilge keels. The dashed line is the roll motion with 1.25 m span bilge keels.
Figure 19:
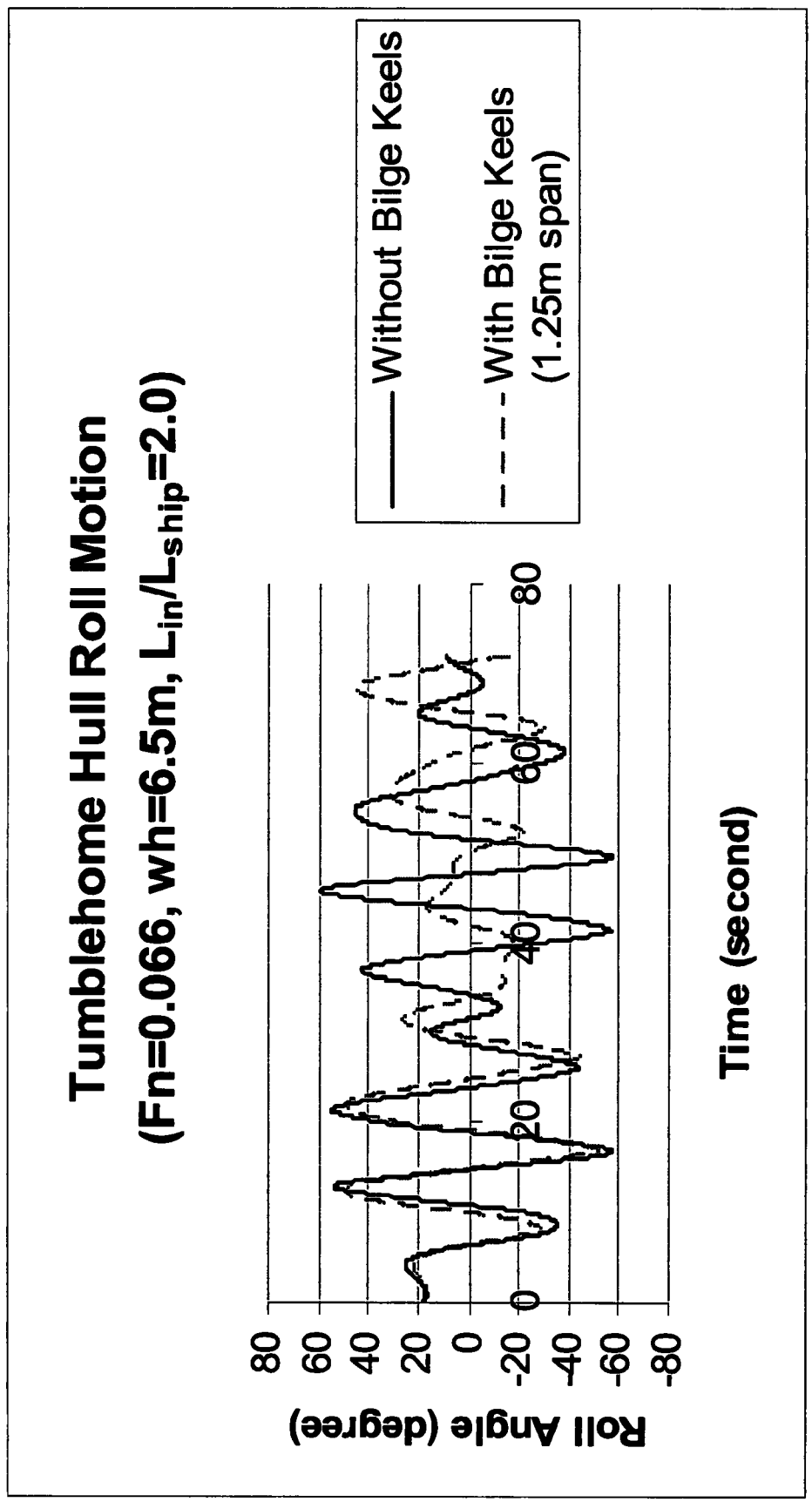
FIG. 19 is a graphical representation, similar to FIG. 18, of the tumblehome hull roll motion time series for Fn=0.066, wave amplitude=6.5 m, λ=2.0 (incident wavelength/ship length). The solid line is the roll motion without the bilge keels. The dashed line is the roll motion with 1.25 m span bilge keels.

Illustrated in FIG. 18 through FIG. 21 are the numerical results of the tumblehome hull roll motion in a regular beam sea impinging on the starboard side of the ship. In FIG. 18 and FIG. 19, respectively, the wave amplitude is 2.23 m and 6.5 m. In both cases, the incident wavelength $L_{in}$ is twice the ship length $L_s$, i.e., $\lambda \equiv L_{in}/L_s=2$. The other parameters are the same, as well: Fn=0.066, $h_{bk}$=1.25 m, $L_{bk}$=102.67 m (the full length). The present inventors calculated the roll motion with (dashed lines) and without (solid lines) the bilge keels. As demonstrated in the numerical results, the bilge keel's blocking effect on the roll motion is very significant. It is clearly observed from FIG. 18 that the roll amplitude is reduced by as much as 20% when the bilge keels' blocking effects are included. The reduction increases significantly with the incident wave amplitude, as shown in FIG. 19. This implies that the bilge keels' overall blocking effect is stronger for larger incident wave amplitudes. It is clearly seen in FIG. 19 that the blocking effect changes the roll motion frequencies, as well.

Figure 20:
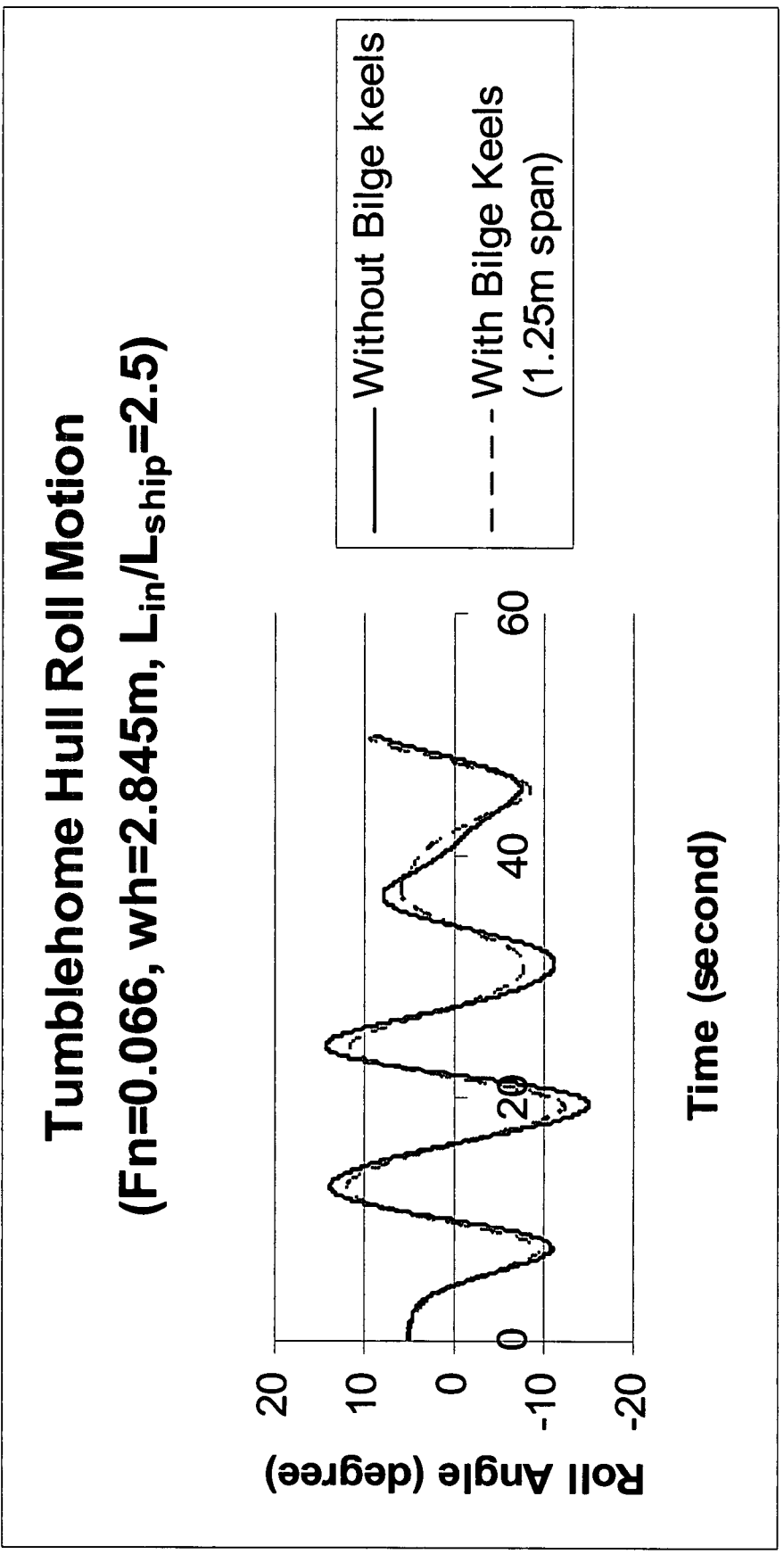
FIG. 20 is a graphical representation, similar to FIG. 18 and FIG. 19, of the tumblehome hull roll motion time series for Fn=0.066, wave amplitude=2.845 m, λ=2.5 (incident wavelength/ship length). The solid line is the roll motion without the bilge keels. The dashed line is the roll motion with 1.25 m span bilge keels.
Figure 21:
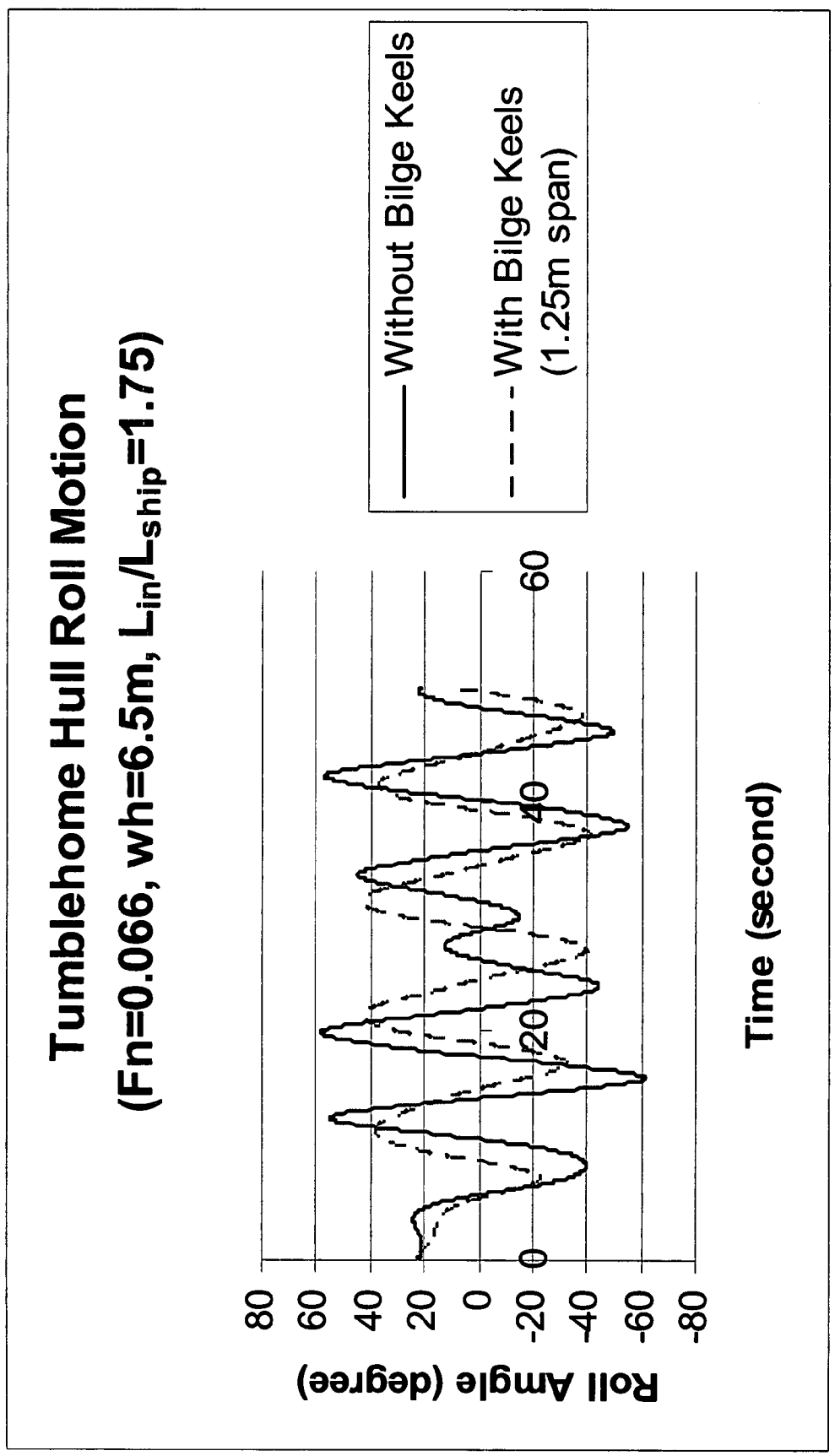
FIG. 21 is a graphical representation, similar to FIG. 18, FIG. 19 and FIG. 20, of the tumblehome hull roll motion time series for Fn=0.066, wave amplitude=6.5 m, λ=1.75 (incident wavelength/ship length). The solid line is the roll motion without the bilge keels. The dashed line is the roll motion with 1.25 m span bilge keels.

This finding in rolling wave frequency change prompted the present inventors to investigate further the blocking effect with different incident wavelengths. In FIG. 20 are the roll motion results for $\lambda=2.5$. The wave amplitude is 2.845 m, slightly larger than that in FIG. 18. The other parameters remain the same. The present inventors' numerical results show that the reduction in FIG. 20 is obviously smaller than that shown in FIG. 18. This result—that the reduction is smaller with larger wave amplitudes—seemed contradictory to our earlier conclusion; however, this contradiction really indicates the importance of the resonance in the blocking effect. The wavelength in FIG. 18 is closer to the intrinsic frequency of the tumblehome (shown in FIG. 15), and thus is closer to the resonance. On the other hand, the wavelength in FIG. 20 is further away from the resonant frequency. Therefore, the smaller reduction in FIG. 20 indicates that the blocking effect will increase significantly when closer to the resonance. To further test this, the present inventors evaluated the ship roll motion with the same conditions as those in FIG. 19, but with a smaller $\lambda=1.75$. The results are shown in FIG. 21. From these figures we can observe that the blocking effect in FIG. 21 is slightly stronger than that in FIG. 19, consistent with the present inventors' earlier conclusions. Therefore, the numerical results suggest that the bilge keel's blocking effect is stronger for larger wave amplitude (with a given wavelength), and is stronger when the incident wavelength is closer to the hull intrinsic frequencies.

Figure 22:
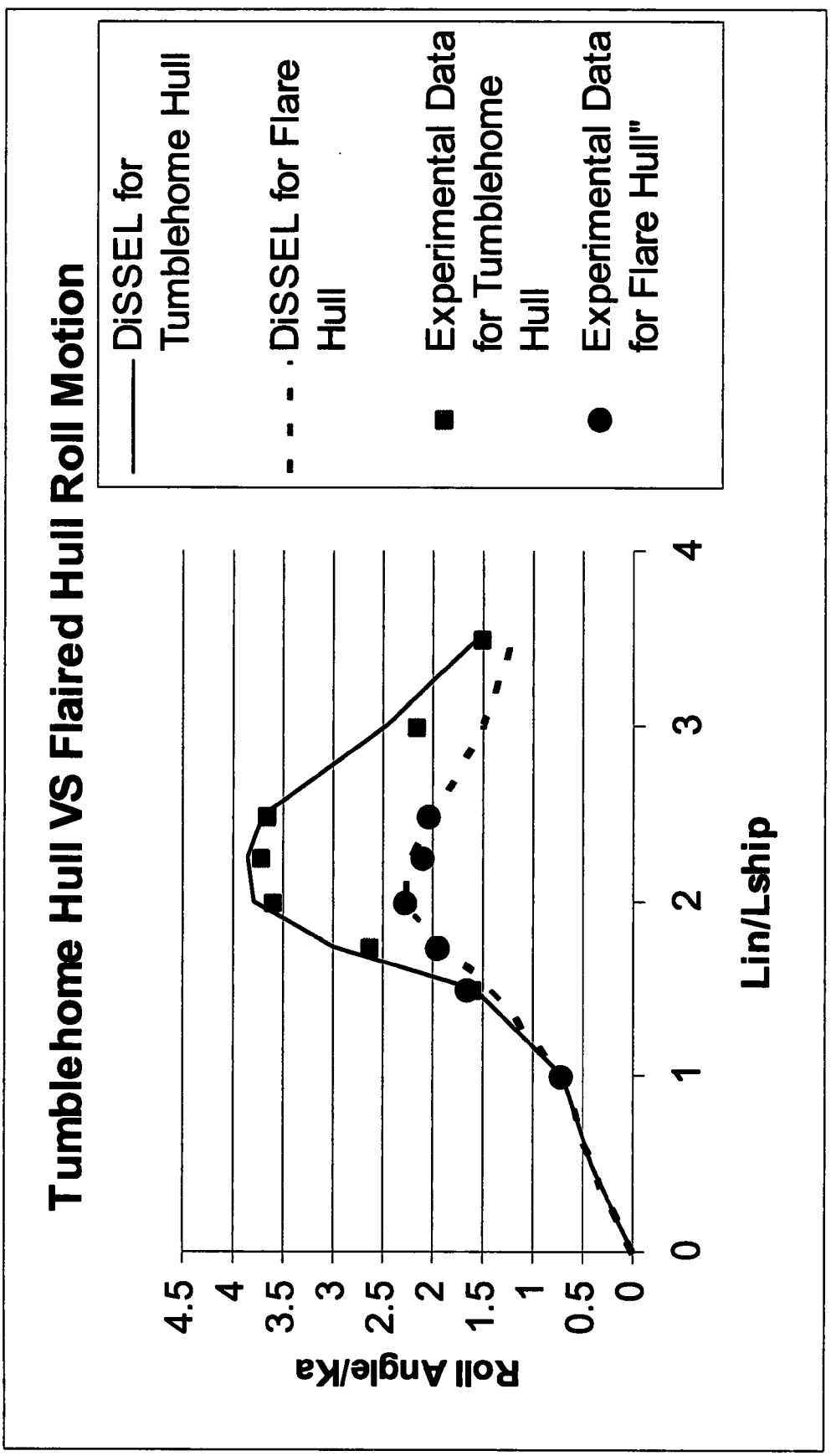
FIG. 22 is a graphical representation of the normalized roll motion angle for different λ with Fn=0.066. The solid line is the numerical result for the tumblehome hull, and the dashed line is the numerical result for the flared hull. The experimental data for the two hulls are the squares (tumblehome hull) and the circles (flared hull). The measurement error is 0.05, which is too small to be plotted, as it is smaller than each of the square boxes representing experimental tumblehome data.
Figure 23:
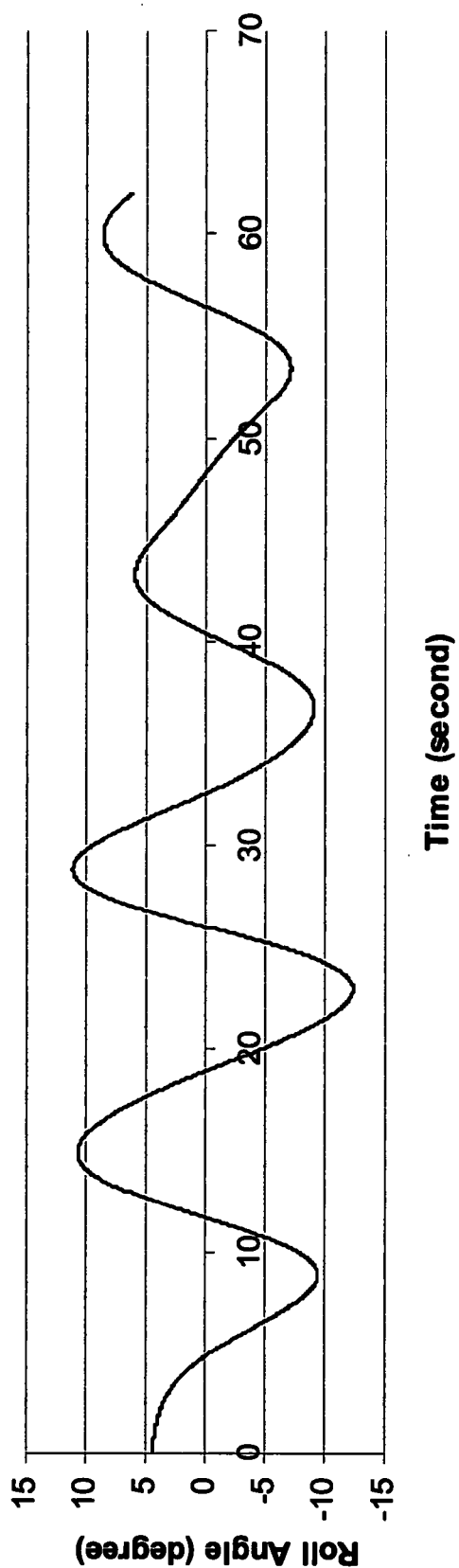
FIG. 23 is a graphical representation of the roll motion of the tumblehome hull as it varies with time in full scale, where $\lambda=L_{in}/L_{ship}=2.25$, and wave amplitude=2.84 meters. This roll motion is associated with the solid line in the resonant area as shown in FIG. 22.

The inventive damping function is also benchmarked with experimental data. The present inventors calculated the roll motions of the tumblehome and flared hulls with various incident wavelengths (or the normalized wavelength $\lambda$). These numerical results, in terms of the normalized roll motion amplitude versus $\lambda$, are summarized in FIG. 22. In these tests, $h_{bk}$=1.25 m and Fn=0.066. In FIG. 22, the solid line represents the numerical rolling angles of the tumblehome hull, and the dashed line represents the numerical rolling angles of the flared hull. The corresponding experimental data are in squares and circular dots for the two hulls, respectively. From FIG. 22 it is clearly observed that the numerical results agree well with the experimental data. It is also noticed from FIG. 22 that the tumblehome hull roll angles are much larger than those of the flared hull under the same conditions. The difference is the largest when $\lambda$ equals the resonant value, in which case the roll angle of the tumblehome hull nearly doubles that of the flared hull. FIG. 23 shows the roll motion of the tumblehome hull as it varies with time in full scale, where $\lambda=L_{in}/L_{ship}=2.25$, and incident wave amplitude=2.84 meters. This roll motion is associated with the solid line in the resonant area as shown in FIG. 22.

Figure 24:
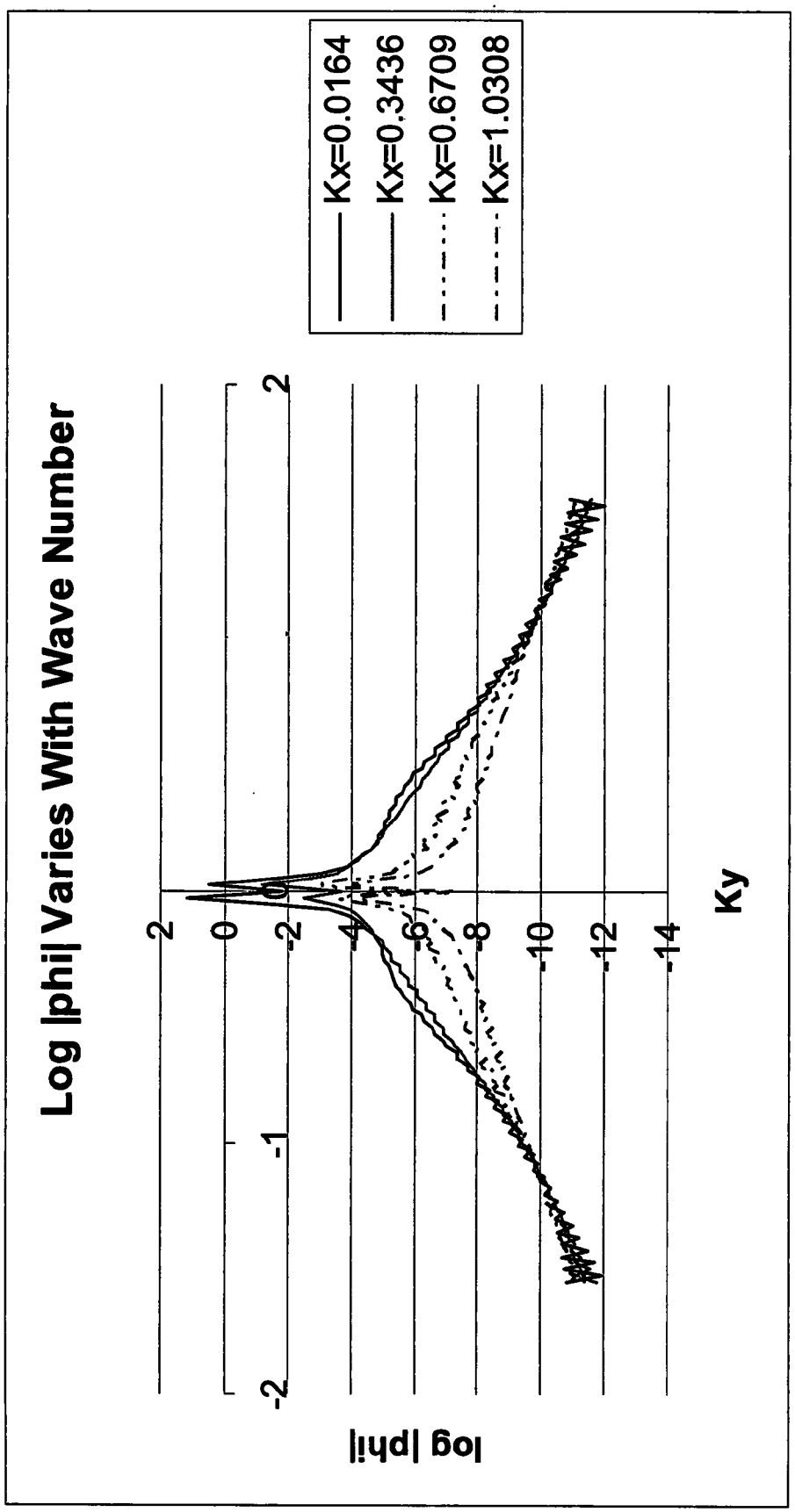
FIG. 24 and FIG. 25 are graphical representations of the distribution $\log_{10}|\phi|$ in the spectral space $(k_x, k_y)$ for the solution at t=23s in FIG. 23. The distributions in the wave number $k_y$ for several wave numbers $k_x$ are shown in FIG. 24. The distributions in $k_x$ for several $k_y$ are shown in FIG. 25.
Figure 25:
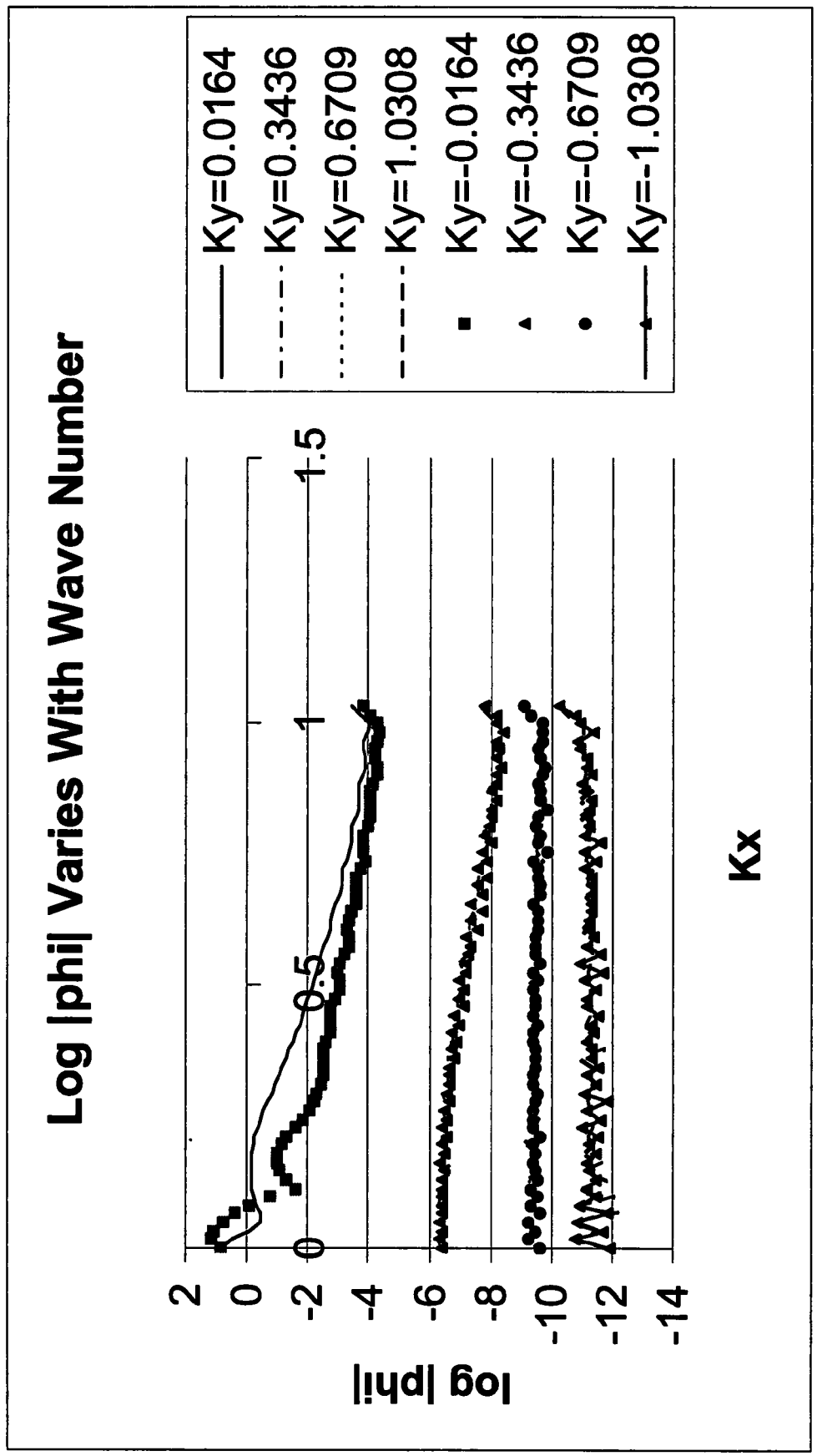

The convergence of the numerical solutions can be tested by the distribution of the spectral coefficients of the physical variables (e.g. the velocity potential $\phi$) with respect to the (discrete) expansion wave numbers ($k_x$, $k_y$) in the (x, y) axes. To show the convergence, plotted in FIG. 24 and FIG. 25 are the distributions of the spectral coefficients of the velocity potential $\phi$ (of the solution in FIG. 23 at t=23s) in the ($k_x$, $k_y$) spectral space. Shown in FIG. 24 are the distributions of $|\phi|$ in $k_y$ for different $k_x$, while shown in FIG. 25 are the distributions in $k_x$ for different $k_y$. From FIG. 24 and FIG. 25 one can find that the spectral coefficient decreases by more than 10 orders of magnitude from small wave numbers ($k_x$, $k_y$) to the maximum wave numbers in the expansion. For example, the coefficient for the wave numbers ($k_x$, $k_y$)=(0.0164, 0.0164) is twelve orders of magnitude greater than that for ($k_x$, $k_y$)= (1.0308, 1.0308). In particular, the decrease is monotonic, except at very large values of $k_x$; however, in latter cases, the magnitude is very small, beyond the accuracy of the computing systems. Therefore, the convergence of the numerical solutions is quite satisfactory.

CONCLUDING REMARKS

Presented in the instant disclosure is an inventive algorithm on the ship solid-body-motion-driven interactions between the ship and waves (including incidental waves). The inventive ship motion model is fully nonlinear; that is, no linearization is introduced in its modeling of ship position, wave-wave and ship-wave interactions. All forces on ship bodies are fully implemented in the inventive ship motion model; neither linearization nor parameterization is introduced in the inventive ship motion model, with the exception of dissipative effect due to wave-breaking.

The present inventors tested the inventive ship motion model using the Delft Catamaran No. 372 ship/boat test model. The benchmark results for heave and pitch motions, illustrated in FIG. 5 through FIG. 12, demonstrate that the present invention's ship motion model agrees well with experiments for various Froude numbers $F_n$. The results also show that the inventive ship motion model is more accurate than the linear models, especially when the Froude number is large. The nonlinear effects are especially significant for steep incident waves and/or large Froude numbers. The results of the inventive ship motion model results are demonstrably much closer to experimental results than are the results from linearized models; nevertheless, small differences are still observed between the inventive ship motion model results and experimental data for very large Froude numbers. These discrepancies may be partly attributable to numerical errors introduced in mapping finite different ship body grids to pseudo-spectral grids.

The present inventors' ship motion model complements their ship-wave interaction model as disclosed in their U.S. nonprovisional patent application Ser. No. 11/518,740 filed 1 Sep. 2006. Their ship-wave interaction model involves steady state ship motion wherein a global pseudo-spectral method is applied together with a finite element or finite different ship boundary grid, and wherein the boundary condition can be solved indirectly with an effective pressure field near the ship boundary. Their inventive ship motion model can be used for single-hull or multi-hull vessels. The present inventors' DiSSEL ship motion computer program embodies a combination of elements of their ship-wave interaction model and their ship motion model.

Any aspect or group of aspects of the present invention, and/or the invention disclosed by U.S. nonprovisional patent application Ser. No. 11/518,740, admits of embodiment as a method, an apparatus (e.g., comprising a machine having a memory), or a computer program product. That is, the present inventors' ship motion model (such as exemplified by the DiSSEL_SB component of their DiSSEL computer program), or their ship-wave interaction model (such as exemplified by the DiSSEL_SW component of their DiSSEL computer program), or some combination thereof (such as exemplified by their overall DiSSEL computer program, which comprises the DiSSEL_SB component and the DiSSEL_SW component), can be thus embodied. Typical inventive practice provides for utilization of a computer (including a processor) for rendering mathematical determinations in accordance with inventive principles. A computer program product (e.g., algorithmic software) embodying one or more aspects of the present invention and/or the invention of application Ser. No. 11/518,740 is resident in the memory of the computer. FIG. 5 is diagrammatically illustrative of residence of an inventive computer program product 10 in the memory of the present invention's computer 100, and is intended herein to be generally representative of the involvement of computers in practice of the present invention and or the invention of application Ser. No. 11/518,740, in any or all of their aspects. The graph in FIG. 5 is shown connected to computer 100 by way of example, as an inventive computer program product 10 can be used to generate multifarious types of information.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A computer-implemented numerical method for modeling the motion of a ship interacting with water waves, the numerical method comprising:
   determining, via a computer, the three-dimensional solid-body rotation of the ship, said three-dimensional solid-body rotation being about the center of mass of the ship, wherein said determining of the three-dimensional solid-body rotation uses a total velocity potential as the sole parameterization and includes calculating the pressure torque and calculating the buoyancy torque, said pressure torque being the torque associated with the total pressure of water on the time-variant wetted surface of the actual geometry of the ship, said actual geometry including the underwater geometry of the ship, said buoyancy torque being the torque associated with displacement of the ship from an equilibrium position in the water; and
   determining, via a computer, the three-dimensional solid-body translation of the ship, said three-dimensional solid-body translation being of the center of mass of the ship, wherein said determining of the three-dimensional solid-body translation uses a total velocity potential as the sole parameterization and includes calculating the pressure force and calculating the buoyancy force, said pressure force being the force associated with said total pressure of water on the time-variant wetted surface of the actual geometry of the ship, said actual geometry including the underwater geometry of the ship, said buoyancy force being the force associated with displacement of the ship from an equilibrium position in the water;
   wherein said total pressure of water includes pressure effects, both linear and nonlinear, that are involved in dynamic interaction between the ship and the water.

2. The numerical method of claim 1, wherein said total pressure is non-hydrostatic.

3. The numerical method of claim 1, wherein:
   the numerical method is for modeling the six-dimensional motion of the ship;
   the three dimensions of said three-dimensional solid-body rotation are roll, pitch, and yaw;
   the three dimensions of said three-dimensional solid-body translation are heave, surge, and sway.

4. The numerical method of claim 1, wherein:
   the numerical method is for time-varyingly modeling the six-dimensional motion of the ship;
   said determining of said three-dimensional solid-body rotation is performed repeatedly over time so as to be continually updated in accordance with continually updated values of said pressure torque and said buoyancy torque;
   said determining of said three-dimensional solid-body translation is performed repeatedly over time so as to be continually updated in accordance with continually updated values of said pressure force and said buoyancy force;

the three dimensions of said three-dimensional solid-body rotation are roll, pitch, and yaw;
the three dimensions of said three-dimensional solid-body translation are heave, surge, and sway.

5. The numerical method of claim 4, wherein said total pressure is non-hydrostatic.

6. The numerical method of claim 1, wherein said determining of the three-dimensional solid-body rotation and said determining of the three-dimensional solid-body translation include solving the following equation:

$$\hat{n}\cdot\nabla\phi=\hat{n}\cdot[u_s+v_s+\Omega\times(x^\Sigma-x_c)].$$

7. A computer program product comprising a computer-useable medium having computer-readable program code portions stored therein, the computer program product being for numerically modeling the motion of a ship interacting with water waves, said program code portions including:
a first executable said program code portion for determining the three-dimensional solid-body rotational motion of the ship, said three-dimensional solid-body rotational motion being about the center of mass of the ship, wherein said determining of the three-dimensional solid-body rotational motion uses a total velocity potential as the sole parameterization and includes calculating the pressure torque and calculating the buoyancy torque, said pressure torque being the torque associated with the total pressure of water on the time-variant wetted surface of the actual geometry of the ship, said actual geometry including the underwater geometry of the ship, said buoyancy torque being the torque associated with displacement of the ship from an equilibrium position in the water; and
a second executable said program code portion for determining the three-dimensional solid-body translational motion of the ship, said three-dimensional solid-body translational motion being of the center of mass of the ship, wherein said determining of the three-dimensional solid-body translational motion uses a total velocity potential as the sole parameterization and includes calculating the pressure force and calculating the buoyancy force, said pressure force being the force associated with said total pressure of water on the time-variant wetted surface of the actual geometry of the ship, said actual geometry including the underwater geometry of the ship, said buoyancy force being the force associated with displacement of the ship from an equilibrium position in the water;
wherein said total pressure of water includes pressure effects, both linear and nonlinear, that are involved in dynamic interaction between the ship and the water.

8. The computer program product of claim 7, wherein:
the computer program product is for numerically modeling the six-dimensional motion of the ship;
the three dimensions of said three-dimensional solid-body rotational motion are roll, pitch, and yaw;
the three dimensions of said three-dimensional solid-body translational motion are heave, surge, and sway.

9. The computer program product of claim 7, wherein said total pressure is non-hydrostatic.

10. The computer program product of claim 7, wherein:
the computer program product is for numerically modeling the six-dimensional motion of the ship over time;
said determining of the three-dimensional solid-body rotational motion is performed repeatedly over time so as to be continually updated in accordance with continually updated values of said pressure torque and said buoyancy torque;
said determining of the three-dimensional solid-body translational motion is performed repeatedly over time so as to be continually updated in accordance with continually updated values of said pressure force and said buoyancy force;
the three dimensions of said three-dimensional solid-body rotational motion are roll, pitch, and yaw;
the three dimensions of said three-dimensional solid-body translational motion are heave, surge, and sway.

11. The computer program product of claim 10, wherein said total pressure is non-hydrostatic.

12. The computer program product of claim 7, wherein said determining of the three-dimensional solid-body rotation and said determining of the three-dimensional solid-body translation include solving the following equation:

$$\hat{n}\cdot\nabla\phi=\hat{n}\cdot[u_s+v_s+\Omega\times(x^\Sigma-x_c)].$$

13. An apparatus comprising a machine having a memory, said machine containing a data representation pertaining to the motion of a ship interacting with water waves, said data representation being generated, for availability for containment by said machine, by the method comprising:
determining the three-dimensional solid-body rotation of the ship, said three-dimensional solid-body rotation being about the center of mass of the ship, wherein said determining of the three-dimensional solid-body rotation uses a total velocity potential as the sole parameterization and includes calculating the pressure torque and calculating the buoyancy torque, said pressure torque being the torque associated with the total pressure of water on the time-variant wetted surface of the actual geometry of the ship, said actual geometry including the underwater geometry of the ship, said buoyancy torque being the torque associated with displacement of the ship from an equilibrium position in the water; and
determining the three-dimensional solid-body translation of the ship, said three-dimensional solid-body translation being of the center of mass of the ship, wherein said determining of the three-dimensional solid-body translation uses a total velocity potential as the sole parameterization and includes calculating the pressure force and calculating the buoyancy force, said pressure force being the force associated with said total pressure of water on the time-variant wetted surface of the actual geometry of the ship, said actual geometry including the underwater geometry of the ship, said buoyancy force being the force associated with displacement of the ship from an equilibrium position in the water;
wherein said total pressure of water includes pressure effects, both linear and nonlinear, that are involved in dynamic interaction between the ship and the water.

14. The apparatus of claim 13, wherein said total pressure is non-hydrostatic.

15. The apparatus of claim 13, wherein:
said data representation is generated repeatedly by said method so as to indicate the six-dimensional motion of the ship;
the three dimensions of said three-dimensional solid-body rotation are roll, pitch, and yaw;
the three dimensions of said three-dimensional solid-body translation are heave, surge, and sway.

16. The apparatus of claim 11, wherein:
said data representation is generated repeatedly by said method so as to indicate the six-dimensional motion of the ship on a continual basis;
said determining of the three-dimensional solid-body rotation is performed repeatedly so as to be updated on a continual basis in accordance with continually updated values of said pressure torque and said buoyancy torque;

said determining of the three-dimensional solid-body translation is performed repeatedly so as to be updated on a continual basis in accordance with continually updated values of said pressure force and said buoyancy force;

the three dimensions of said three-dimensional solid-body rotation are roll, pitch, and yaw;

the three dimensions of said three-dimensional solid-body translation are heave, surge, and sway.

17. The apparatus of claim 16, wherein said total pressure is non-hydrostatic.

18. The apparatus of claim 13, wherein said determining of the three-dimensional solid-body rotation and said determining of the three-dimensional solid-body translation include solving the following equation:

$$\hat{n}\cdot\nabla\phi = \hat{n}\cdot[u_s + v_s + \Omega\times(x^{\Sigma} - x_c)].$$

* * * * *